United States Patent
Yoshida et al.

(10) Patent No.: US 6,724,570 B2
(45) Date of Patent: Apr. 20, 2004

(54) THIN FILM MAGNETIC HEAD AND METHOD OF MANUFACTURING THE SAME

(75) Inventors: Makoto Yoshida, Tokyo (JP); Taro Oike, Tokyo (JP); Atsushi Iijima, Tokyo (JP)

(73) Assignee: TDK Corporation, Tokyo (JP)

( * ) Notice: Subject to any disclaimer, the term of this patent is extended or adjusted under 35 U.S.C. 154(b) by 163 days.

(21) Appl. No.: 09/800,581

(22) Filed: Mar. 8, 2001

(65) Prior Publication Data

US 2001/0030831 A1 Oct. 18, 2001

(30) Foreign Application Priority Data

Mar. 10, 2000 (JP) .................................. 2000-072508
Mar. 7, 2001 (JP) .................................. 2001-063199

(51) Int. Cl.$^7$ .............................................. G11B 5/147
(52) U.S. Cl. ...................................................... 360/126
(58) Field of Search .................................. 360/126, 317

(56) References Cited

U.S. PATENT DOCUMENTS

| | | | | |
|---|---|---|---|---|
| 4,742,413 A | * | 5/1988 | Schewe | 360/126 |
| 4,951,166 A | * | 8/1990 | Schewe | 360/119 |
| 5,126,907 A | * | 6/1992 | Hamakawa et al. | 360/126 |
| 5,245,493 A | * | 9/1993 | Kawabe et al. | 360/126 |
| 5,828,533 A | * | 10/1998 | Ohashi et al. | 360/126 |
| 5,872,693 A | * | 2/1999 | Yoda et al. | 360/126 |
| 6,317,288 B1 | * | 11/2001 | Sasaki | 360/126 |
| 6,430,003 B1 | * | 8/2002 | Sasaki | 360/126 |
| 6,483,663 B2 | * | 11/2002 | Okada et al. | 360/126 |
| 2001/0043434 A1 | * | 11/2001 | Urai et al. | 360/126 |
| 2002/0018317 A1 | * | 2/2002 | Sato et al. | 360/126 |
| 2002/0071210 A1 | * | 6/2002 | Kawabe et al. | 360/126 |
| 2002/0071211 A1 | * | 6/2002 | Kamijima | 360/126 |

* cited by examiner

Primary Examiner—William Klimowicz
(74) Attorney, Agent, or Firm—Oliff & Berridge PLC

(57) ABSTRACT

A thin film magnetic head having excellent recording characteristics is provided. In a structure of the thin film magnetic head, a thickness $L_T$ ($\mu$m) of a top pole chip and a distance $L_D$ ($\mu$m) between a position of a front edge surface of a top yoke and a position of an air bearing surface are adapted to satisfy $L_D \geq L_T - 2.0$ ($\mu$m) ($L_D \geq 0$, $L_T < 0$). In the thin film magnetic head having such structural features, the above-mentioned thickness $L_T$ and distance $L_D$ having an influence upon recording characteristics are optimized, and thus the occurrence of side erase during recording can be prevented.

40 Claims, 10 Drawing Sheets

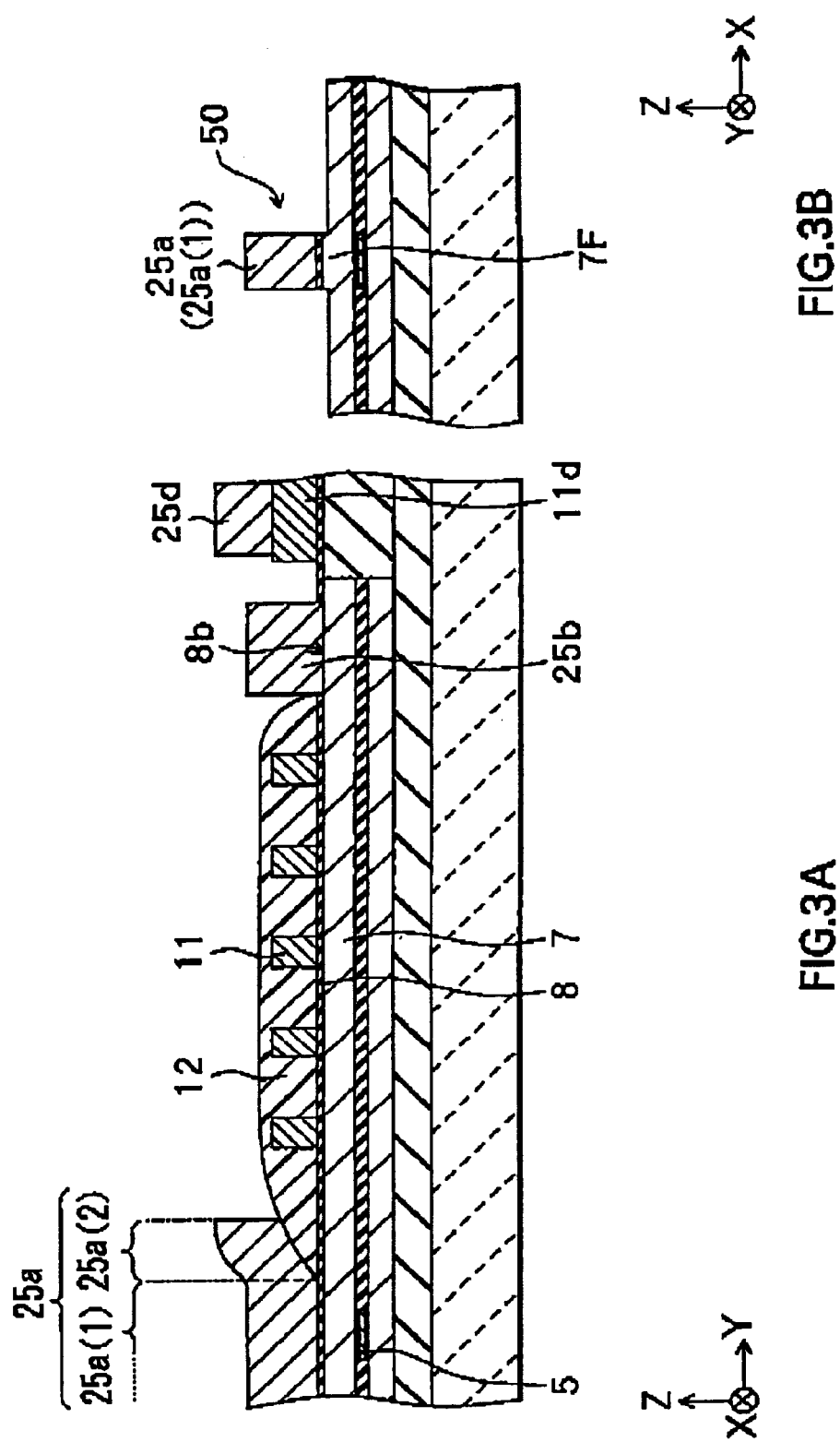

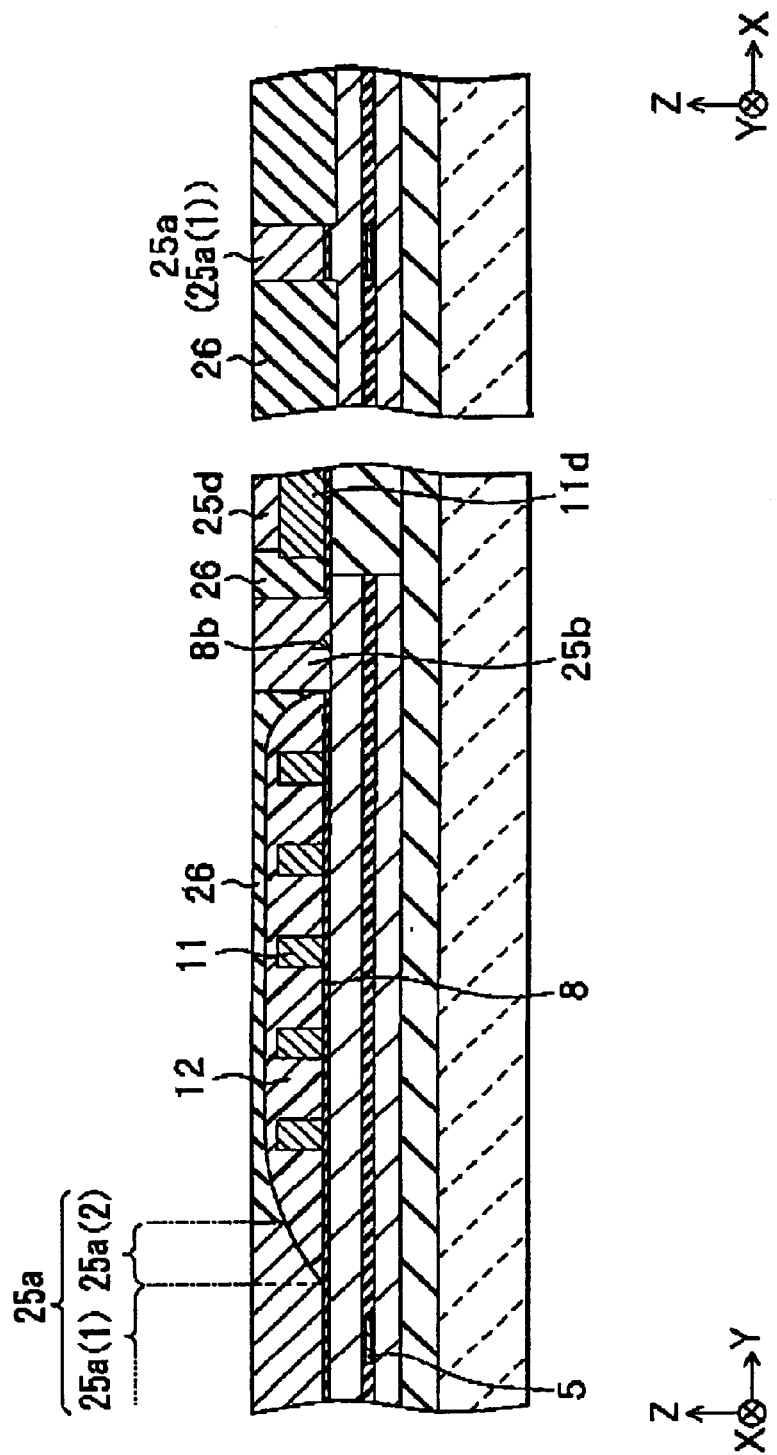

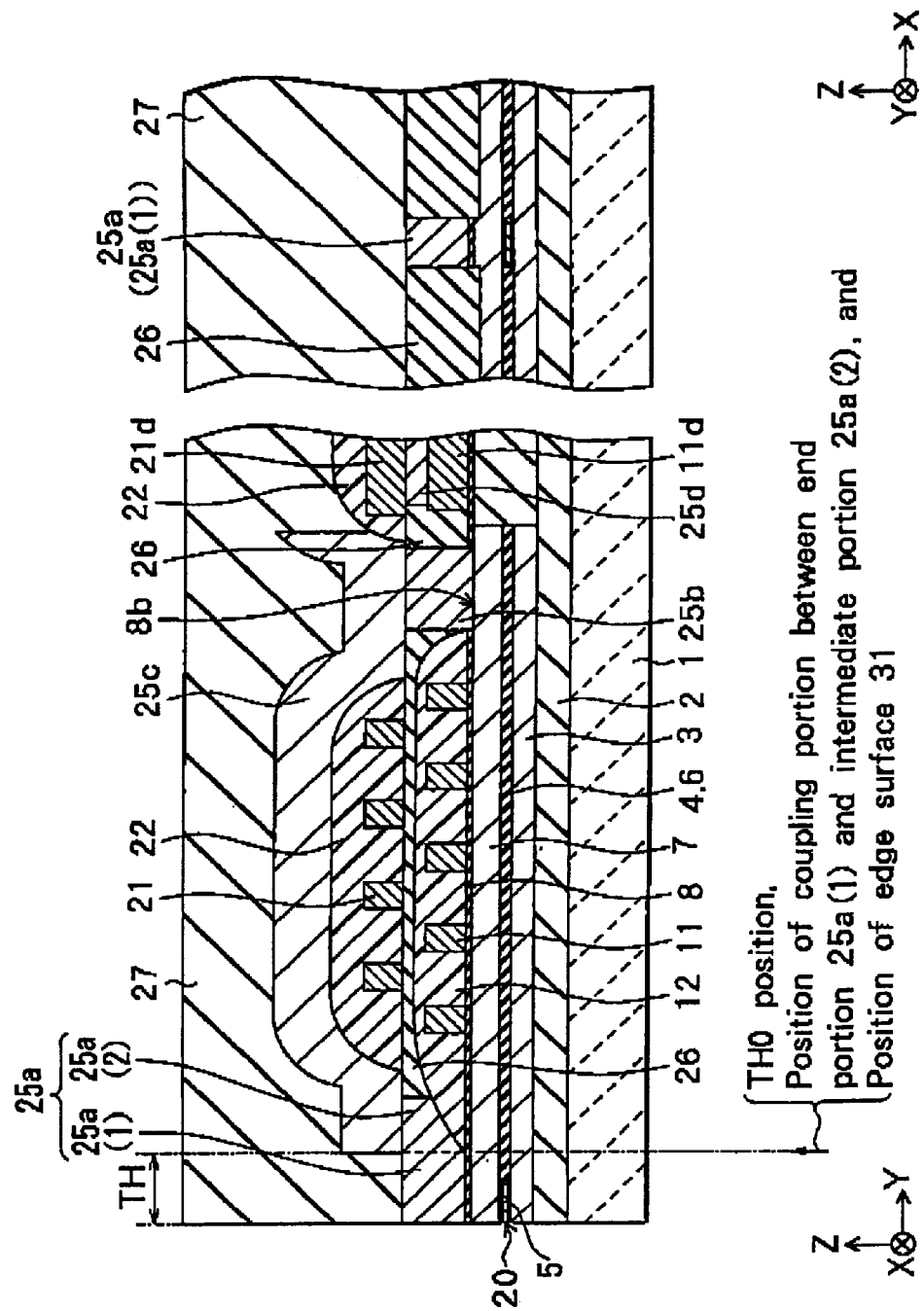

THIN FILM MAGNETIC HEAD AND METHOD OF MANUFACTURING THE SAME

BACKGROUND OF THE INVENTION

1. Field of the Invention

The invention relates to a thin film magnetic head having at least an inductive magnetic transducer for writing, and a method of manufacturing the same.

2. Description of the Related Art

Recently, an improvement in performance of a thin film magnetic head has been sought in accordance with an increase in a surface recording density of a hard disk drive. A composite thin film magnetic head, which has a stacking structure comprising a recording head having an inductive magnetic transducer for writing and a reproducing head having a magnetoresistive (hereinafter referred to as MR) element for reading, is widely used as the thin film magnetic head.

An improvement in performance of the recording head is also sought in accordance with an improvement in performance of the reproducing head. Factors that determine the performance of the recording head include a throat height (TH). The throat height refers to a length of a pole portion between an air bearing surface that is a recording head surface facing a magnetic recording medium (hereinafter referred to as "a recording medium") and an edge of an insulating layer for electrically isolating a thin film coil for generating a magnetic flux. Optimization of the throat height is desired for the improvement in the performance of the recording head. The throat height is controlled by the amount of polishing of the air bearing surface.

To increase the surface recording density of the performance of the recording head, it is necessary to finely narrow a write width (a write track width) on the recording medium during recording and thus increase a write track density. For this purpose, it is necessary to realize a recording head having a narrow track structure in which a width (a pole width) of the pole portion of the recording head on the air bearing surface is as narrow as a few microns to the submicron order. Semiconductor fabrication technology enabling high-accuracy microfabrication is widely used as means for realizing the above-mentioned narrow track structure of the pole portion. Currently, various efforts are being made in order to enable ultrafine fabrication of the submicron order.

However, the achievement of high-density recording requires the solution of other factors, even if the ultrafine fabrication of the pole portion is made possible and also the accuracy in fabricating the pole portion is improved.

Factors inhibiting high-density recording include, for example, the occurrence of side erase, the deterioration in overwrite characteristics, and so on. Herein, the "side erase" refers to a phenomenon in which a write operation for writing information on a specified write track causes information to be written on an adjacent region as well as the specified write track region and thus magnetic data already recorded on the adjacent region is magnetically overwritten with the written information and is lost. The "overwrite characteristics" refer to magnetic overwrite characteristics: magnetic data on a recording medium is updated by overwriting existing magnetic data with new magnetic data. Both the occurrence of side erase and the deterioration in overwrite characteristics cause considerable deterioration in recording characteristics of a thin film magnetic head. More particularly, a tendency to cause these problems is more noticeable as a write track is narrower and smaller. Because of these facts, rapid improvement to the above-mentioned problems is needed with the increase in a write track density due to the narrowing and reduction of the pole width of the thin film magnetic head.

SUMMARY OF THE INVENTION

The invention is designed to overcome the foregoing problems. It is an object of the invention to provide a thin film magnetic head which can obtain good recording characteristics even when a pole width is narrowed and reduced, and a method of manufacturing the same.

There is provided a thin film magnetic head of the invention including: two magnetic layers magnetically coupled to each other and having two magnetic poles which face each other with a gap layer in between near and in a recording-medium-facing surface to be faced with a recording medium, a thin film coil provided between the two magnetic layers, and an insulating layer for insulating the thin film coil from at least one of the two magnetic layers having a first magnetic layer portion and a second magnetic layer portion, the first magnetic layer portion having a uniform-width portion extending away from a recording-medium-facing surface facing a recording medium and defining a write track width on the recording medium, and the second magnetic layer portion coating a region in which the thin film coil portion is provided and partly overlapping and magnetically coupled to a part of the first magnetic layer portion, wherein a distance $L_D$ ($\mu$m) between a position of an edge of the second magnetic layer portion closest to the recording-medium-facing surface and a position of the recording-medium-facing surface and a thickness $L_T$ ($\mu$m) of a portion of the first magnetic layer portion exposed to the recording-medium-facing surface satisfy $L_D \geq L_T - 2.0$ ($\mu$m).

In the thin film magnetic head of the invention, the write track width on the recording medium is defined by the uniform-width portion of the first magnetic layer portion. The second magnetic layer portion is arranged so as to partly overlap a part of the first magnetic layer portion, and thus the second magnetic layer portion is magnetically coupled to the part of the first magnetic layer portion.

There is provided a method of manufacturing a thin film magnetic head of the invention including: two magnetic layers magnetically coupled to each other and having two magnetic poles which face each other with a gap layer in between near and in a recording-medium-facing surface to be faced with a recording medium, a thin film coil provided between the two magnetic layers, and an insulating layer for insulating the thin film coil from at least one of the two magnetic layers having a first magnetic layer portion and a second magnetic layer portion, the first magnetic layer portion having a uniform-width portion extending away from a recording-medium-facing surface facing a recording medium and defining a write track width on the recording medium, and the second magnetic layer portion coating a region in which the thin film coil portion is provided and partly overlapping and magnetically coupled to a part of the first magnetic layer portion, wherein the first magnetic layer portion and the second magnetic layer portion are formed so that a distance $L_D$ ($\mu$m) between a position of an edge of the second magnetic layer portion closest to the recording-medium-facing surface and a position of the recording-medium-facing surface and a thickness $L_T$ ($\mu$m) of a portion of the first magnetic layer portion exposed to the recording-medium-facing surface satisfy $L_D \geq L_T - 2.0$ ($\mu$m).

In the thin film magnetic head and the method of manufacturing the same of the invention, it is preferable that a minimum value $L_{Tmin}$ of the thickness $L_T$ satisfy $L_{Tmin}=-0.5Bs+1.5$, and a maximum value $L_{Dmax}$ of the distance $L_D$ satisfy $L_{Dmax}=0.5Bs+3.0$, where Bs is a saturation magnetic flux density.

In the thin film magnetic head and the method of manufacturing the same of the invention, the one magnetic layer may be made of a material containing a nickel-iron alloy, or the one magnetic layer may be made of a material containing iron nitride. In the former case, it is preferable that the distance $L_D$ be within a range of $0 \leq L_D < 3.5$ ($\mu$m) and the thickness $L_T$ be within a range of $1.0$ ($\mu$m)$<L_T \leq 3.5$ ($\mu$m). In the latter case, it is preferable that the distance $L_D$ be within a range of $0 \leq L_D < 4.0$ ($\mu$m) and the thickness $L_T$ be within a range of $0.5$ ($\mu$m)$<L_T \leq 3.5$ ($\mu$m). In the former case, it is more preferable that the thickness $L_T$ be within a range of $1.0$ ($\mu$m)$<L_T < 3.5$ ($\mu$m). In the latter case, it is more preferable that the thickness $L_T$ be within a range of $0.5$ ($\mu$m) $<L_T < 3.5$ ($\mu$m).

Other and further objects, features and advantages of the invention will appear more fully from the following description.

BRIEF DESCRIPTION OF THE DRAWINGS

FIGS. 3A and 3B are cross sectional views for describing a step following the step of FIGS. 2A and 2B;

FIGS. 4A and 4B are cross sectional views for describing a step following the step of FIGS. 3A and 3B;

FIGS. 6A and 6B are cross sectional views for describing a step following the step of FIGS. 5A and 5B;

DETAILED DESCRIPTION OF THE PREFERRED EMBODIMENTS

An embodiment of the invention will be described in detail below with reference to the accompanying drawings.

Firstly, the description is given with reference to FIGS. 1A to 6B with regard to a method of manufacturing a composite thin film magnetic head as a method of manufacturing a thin film magnetic head according to an embodiment of the invention. Since a thin film magnetic head according to the embodiment is embodied by the method of manufacturing a thin film magnetic head according to the embodiment, the thin film magnetic head will be described in conjunction with the method of manufacturing a thin film magnetic head. FIGS. 1A, 2A, 3A, 4A, 5A and 6A show a cross section perpendicular to an air bearing surface. FIGS. 1B, 2B, 3B, 4B, 5B and 6B show a cross section of a pole portion parallel to the air bearing surface.

In the following description, an X-axis direction, a Y-axis direction and a Z-axis direction in FIGS. 1A to 6B are expressed as "a width (or a width direction)", "a length (or a length direction)" and "a thickness (or a thickness directions)", respectively. The side close to an air bearing surface 20 in the Y-axis direction (or the side to form the air bearing surface 20 in the following step) is expressed as "a front side (or a frontward side)", and the opposite side is expressed as "a rear side (or a rearward side)". The same expressions as the above-mentioned expressions are given in the description of FIG. 7 and the following drawings.

<Method of Manufacturing Thin Film Magnetic Head>

Figure 1B:
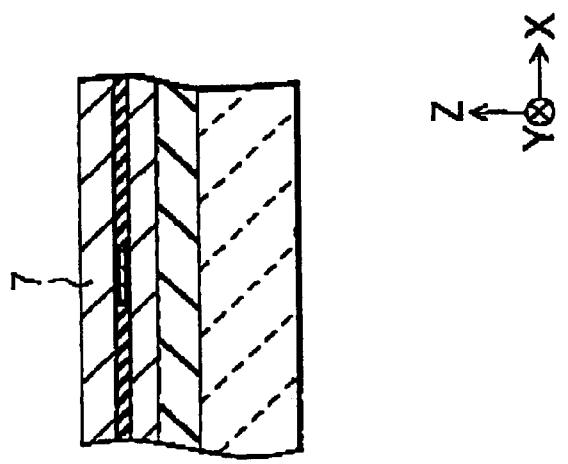
FIGS. 1A and 1B are cross sectional views for describing a step of a method of manufacturing a thin film magnetic head according to an embodiment of the invention.
Figure 1A:
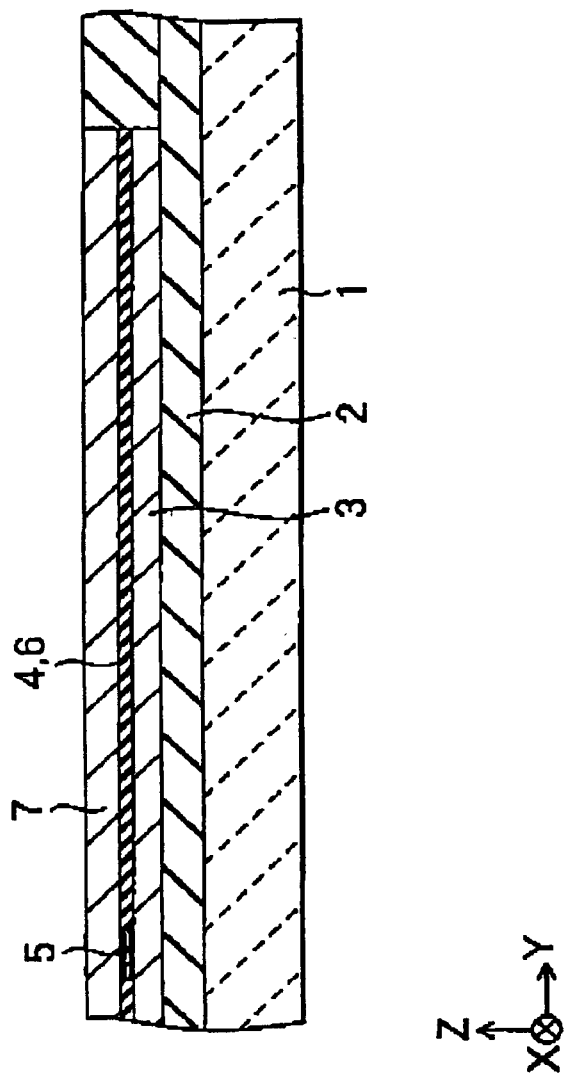

In the method of manufacturing according to the embodiment, first, as shown in FIGS. 1A and 1B, an insulating layer 2 made of, for example, aluminum oxide ($Al_2O_3$, hereinafter referred to as "alumina")is deposited with a thickness of about 3 $\mu$m to 5 $\mu$m on a substrate 1 made of, for example, altic ($Al_2O_3$—TiC). Then, for example, a nickel-iron alloy (NiFe, hereinafter referred to as "Permalloy (a trade name)") is selectively formed with a thickness of about 2 $\mu$m on the insulating layer 2 by using photolithography and plating, and thus a bottom shield layer 3 for a reproducing head is formed.

Next, as shown in FIGS. 1A and 1B, for example, alumina is sputter deposited with a thickness of about 20 nm to 100 nm on the bottom shield layer 3, and thus a shield gap film 4 is formed. Then, an MR film 5 for forming an MR element that is a principal part of the reproducing head is formed on the shield gap film 4, and the MR film 5 is formed into a desired shape by high-accuracy photolithography. Then, lead layers (not shown) for functioning as lead electrode layers to be electrically connected to the MR film 5 are formed on both sides of the MR film 5. After that, a shield gap film 6 is formed on the lead layers, the shield gap film 4 and the MR film 5, and thus the MR film 5 is sandwiched in between the shield gap films 4 and 6. Then, a top shield-cum-bottom pole 7 (hereinafter referred to as "a bottom pole") made of, for example, Permalloy is selectively formed on the shield gap film 6 with a thickness of about 3 $\mu$m to 4 $\mu$m by electroplating, for example.

Next, as shown in FIGS. 1A and 1B, an insulating film made of, for example, alumina is formed over the overall surface. After that, a surface of the insulating Mm is polished by, for example, CMP (Chemical Mechanical Polishing) until the bottom pole 7 is exposed, and thus the overall surface is flattened.

Figures 2A, 2B:
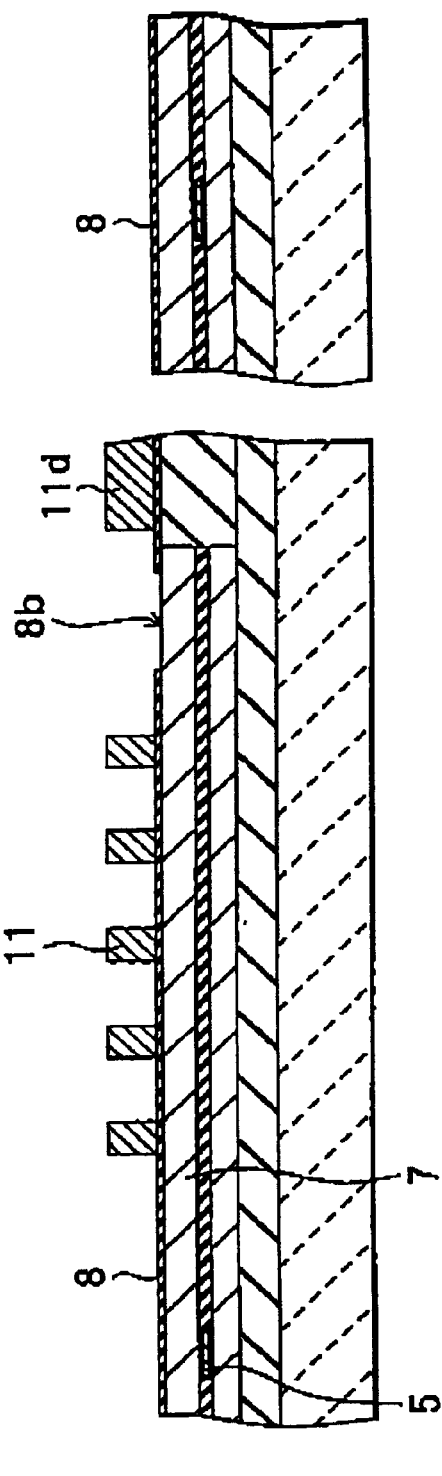
FIGS. 2A and 2B are cross sectional views for describing a step following the step of FIGS. 1A and 1B.

Next, as shown in FIGS. 2A and 2B, a write gap layer 8 made of, for example, alumina is formed with a thickness of about 150 nm to 300 nm over the overall surface. At this time, an opening 8b for connecting the bottom pole 7 to a top pole 25 (a top pole chip 25a, a magnetic path forming pattern 25b and a top yoke 25c) to be formed in the following step is formed in the write gap layer 8. The above-described write gap layer 8 corresponds to a specific example of "a gap layer" of the invention.

Next, as shown in FIGS. 2A and 2B, a first-layer thin film coil 11 made of, for example, copper (Cu) for an inductive recording head is formed with a thickness of about 2 $\mu$m to 3 $\mu$m on the write gap layer 8 by electroplating, for example. The thin film coil 11 has a spiral planar structure shown in FIG. 7 to be described later, for example. The thin film coil 11 is, in part alone, shown in FIG. 2A. At the same time when the thin film coil 11 is formed, for example, a coil connecting portion 11d is integrally formed with the thin film coil 11 on the write gap layer 8 at an inner terminal of the thin film coil 11. The coil connecting portion 11d is a portion for electrically connecting the thin film coil 11 to an interconnection pattern 25d (see FIG. 3A) to be formed in the following step.

Next, as shown in FIGS. 3A and 3B, an insulating film 12 is formed into a predetermined pattern by means of high-accuracy photolithography using a material exhibiting fluidity by heating, e.g., an organic insulating material such as a photoresist, so as to coat the thin film coil 11 and the write gap layer 8 around the thin film coil 11. To form the insulating film 12, the photoresist is subjected to heat treatment at a temperature of, for example, about 200° C. This heat treatment allows an inclined surface to be formed near an edge of the insulating film 12. The insulating film 12 is a film for defining a throat height zero position (a TH0 position) for determining a throat height TH to be described later, and for filing up a gap between turns (windings) of the thin film coil 11. When the insulating film 12 is formed, the opening 8b of the write gap layer 8 is not coated with the insulating film 12. A most front edge (hereinafter referred to as "a most front end") of the insulating film 12 may be located more rearward than a position corresponding to a most rear edge (hereinafter referred to as "a most rear end") of the MR film 5 as shown in FIG. 3A, or the most front end thereof may be located more frontward than the above-mentioned position. Of course, the position of the most front end of the insulating film 12 may be matched to the position of the most rear end of the MR film 5.

Next, as shown in FIGS. 3A and 3B, the top pole chip 25a to form a part of the top pole 25 is selectively formed by frame plating with a predetermined thickness on a region of the write gap layer 8 ranging from a front inclined surface region of the insulating film 12 (a left inclined surface in FIG. 3A) to the side to form the air bearing surface 20 in the following step (the left side in FIG. 3A). Preferably, the "predetermined thickness" is approximately equal to, for example, a last thickness $L_T$ ($\mu$m, see FIG. 8A) of the top pole chip 25a plus 2 $\mu$m. This thickness is set in consideration of a decrease in a film of the top pole chip 25a in the case in which, in the following step, a portion near a surface of the top pole chip 25a is etched by using ion milling or the like and is polished by Using CMP. The thickness $L_T$ of the top pole chip 25a will be described later. The top pole chip 25a has a planar shape shown in FIG. 7 to be described later for example, and includes a tip portion 25a(1) and an intermediate portion 25a(2). Features in the shape of the top pole chip 25a will be described later. At the same time when the top pole chip 25a is formed, the magnetic path forming pattern 25b to form a part of the top pole 25 is formed in the opening 8b and the connecting intermediate pattern 25d is formed on the coil connecting portion 11d. The connecting intermediate pattern 25d is a pattern for electrically connecting the coil connecting portion 11d to a coil connecting portion 21d to be formed in the following step. Since the thin film coil 11 is coated with the insulating film 12, the thin film coil 11 avoids damage resulting from a liquid bath process or the like in the step of frame plating for forming the top pole chip 25a or the like to be described later. A material of the top pole chip 25a will be described later. The above-described top pole chip 25a corresponds to a specific example of "a first magnetic layer portion" of the invention.

To form the top pole chip 25a by use of frame plating, the following procedure is followed. That is, fist, a thin electrode film made of; for example, Permalloy is formed by, for instance, sputtering over the overall surface on an under layer of a region on which the top pole chip 25a or the like is to be provided. Then, a photoresist film is formed by coating the electrode film with a photoresist, the photoresist film is patterned into a desired shape by photolithography, and thus a photoresist pattern for serving as a frame (an outer frame) for forming the top pole chip 25a is formed. Finally, the top pole chip 25a is formed by electroplating for selectively growing a plated film by using the preformed electrode film as a seed layer and using the photoresist pattern as a mask.

Next, as shown in FIG. 3B, the write gap layer 8 and the bottom pole 7 around the top pole chip 25a are etched in self-alignment by about 0.5 $\mu$m by use of the top pole chip 25a as a mask by means of, for example, dry etching using ion milling and dry etching using reactive ion etching using chlorine gas ($Cl_2$, $CF_4$, $BCl_2$, $SF_6$, or the like), and thus a pole portion 50 having a trim structure is formed. The pole portion 50 comprises the tip portion 25a(1) of the top pole chip 25a, a portion (7F) of the bottom pole 7 corresponding to the tip portion 25a(1), and a part of the write gap layer 8 sandwiched between the tip portion 25a(1) and the portion 7F, and these portions have substantially the same width.

Next, as shown in FIGS. 4A and 4B, an insulating film 26 is formed with a thickness of about 3 $\mu$m to 4 $\mu$m over the overall surface by using an inorganic insulating material, e.g., alumina. After that, the overall surface is polished and flattened by, for example, CMP, and thus the top pole chip 25a, the magnetic path forming pattern 26b and the connecting intermediate pattern 25d are exposed. This polishing process allows the thickness of the top pole chip 26a to equal $L_T$ ($\mu$m, see FIG. 8A).

Figures 5A, 5B:
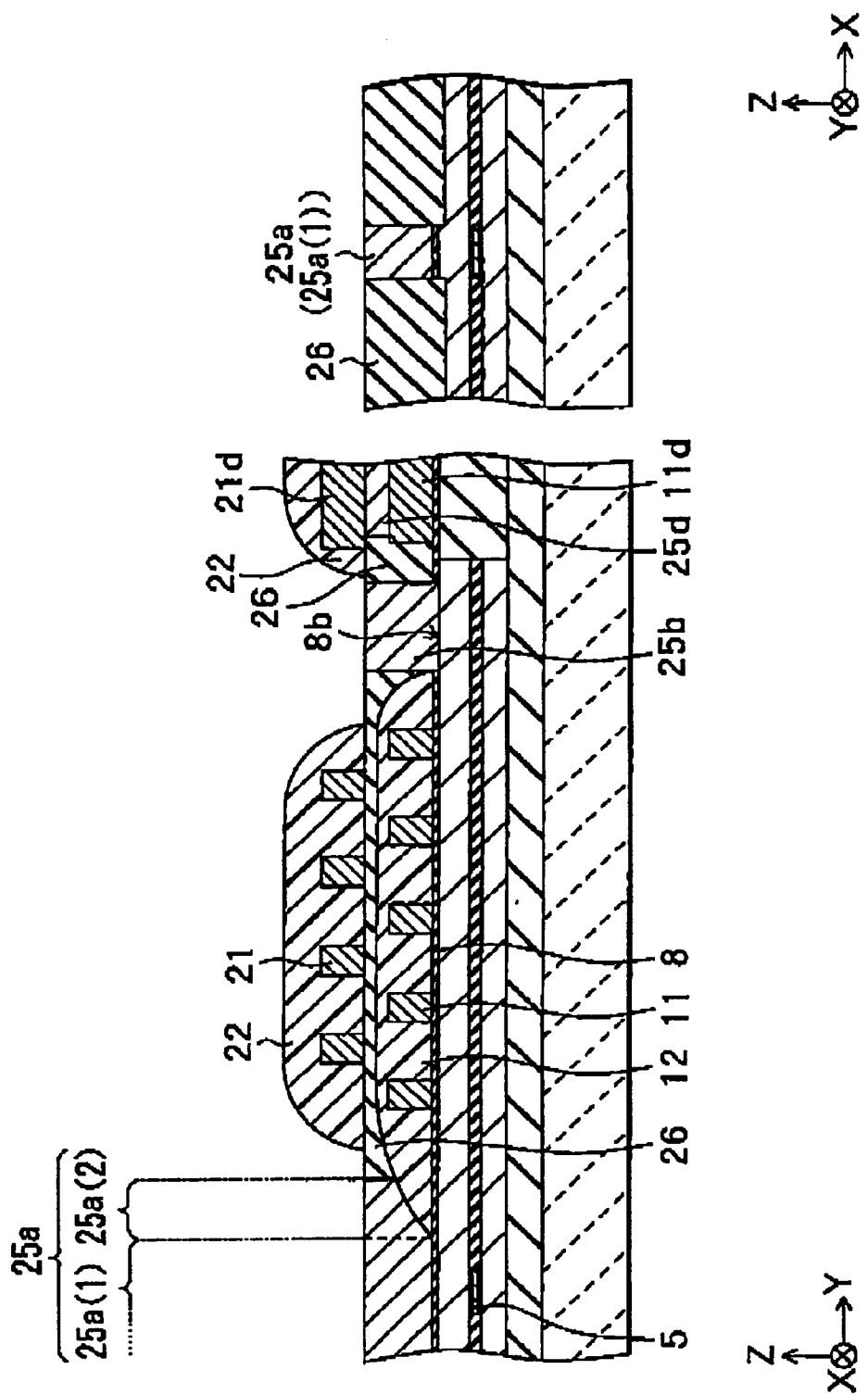
FIGS. 5A and 5B are cross sectional views for describing a step following the step of FIGS. 4A and 4B.

Next, as shown in FIGS. 5A and 5B, a second-layer thin film coil 21 made of, for example, copper (Cu) is formed with a thickness of about 2 $\mu$m to 3 $\mu$m on the flattened insulating film 26 by electroplating having the same step as in the case of forming the first-layer thin film coil 11. The thin film coil 21 has the same planar shape as the planar shape of the thin film coil 11. At the same time when the thin film coil 21 is formed, for example, the coil connecting portion 21d is integrally formed with the thin film coil 21 on the connecting intermediate pattern 25d at an inner periphery end of the thin film coil 21. The thin film coil 11 is electrically connected to the thin film coil 21 through the coil connecting portion 11d, the connecting intermediate pattern 25d and the coil connecting portion 21d. The above-described thin film coils 11 and 21 correspond to a specific example of "a thin film coil portion" of the invention.

Next, as shown in FIGS. 5A and 5B, an insulating film 22 is selectively formed by using the same material as the material of the insulating film 12 and the same method as the method of forming the insulating film 12 including heat treatment), so as to coat the thin film coil 21 and the insulating film 26 around the thin film coil 21. Simultaneously, the insulating film 22 is formed on the coil connecting portion 21d and the insulating film 26 around the coil connecting portion 21d. An inclined surface is also formed near an edge of the insulating film 22 as in the case of the insulating film 12. When the insulating film 22 is formed, an exposed surface of the magnetic path forming pattern 25b is not coated with the insulating film 22. The above-described insulating films 12, 26 and 22 correspond to a specific example of "an insulating layer" of the invention.

Next, as shown in FIGS. 6A and 6B, the top yoke 25c to form a part of the top pole 25 is selectively formed with a thickness of about 3 $\mu$m to 5 $\mu$m so as to coat a region over the thin film coils 11 and 21. The top yoke 25c has a planar shape shown in FIG. 7 to be described later, for example. The top yoke 25c is formed in such a manner that the position of the most front end thereof (an edge surface 31, see FIGS. 7, 8A and 8B) is shifted by a distance $L_D$ ($\mu$m, see FIGS. 8A and 8B) rearward from the position of the air bearing surface 20 to be formed in the following step. The distance $L_D$ for determining a region in which the top yoke 25c is to be provided will be described later. Although FIG. 6A shows the case in which the position of the most front end (the edge surface 31) of the top yoke 25c is matched to the position (the throat height zero position) of the most front end of the insulating film 12, the position of the top yoke 25c is not limited to all example shown in FIG. 6A. A rearward portion of the top yoke 25c is magnetically coupled to the bottom pole 7 through the magnetic path forming pattern 25b provided in the opening 8b, and also a frontward portion of the top yoke 25c is magnetically coupled to the top pole chip 25a. The top yoke 25c is made of, for example, the same material as the material of the top pole chip 25a and the magnetic path forming pattern 25b. The above-described top yoke 25c corresponds to a specific example of "a second magnetic layer portion" of the invention, and the above-described top pole 25 (the top pole chip 25a, the magnetic path forming pattern 25b and the top yoke 25c) corresponds to a specific example of "one of two magnetic layers" of the invention.

Next, as shown in FIGS. 6A and 6B, an overcoat layer 27 made of, for example, alumina is formed so as to coat the overall surface. Finally, the air bear surface 20 of the recording head and the reproducing head is formed by machining and polishing, and thus the thin film magnetic head is completed.

<Structure of Thin Film Magnetic Head>

Next, the structure of the thin film magnetic head according to the embodiment will be described with reference to FIGS. 6A, 6B and 7.

Figure 7:
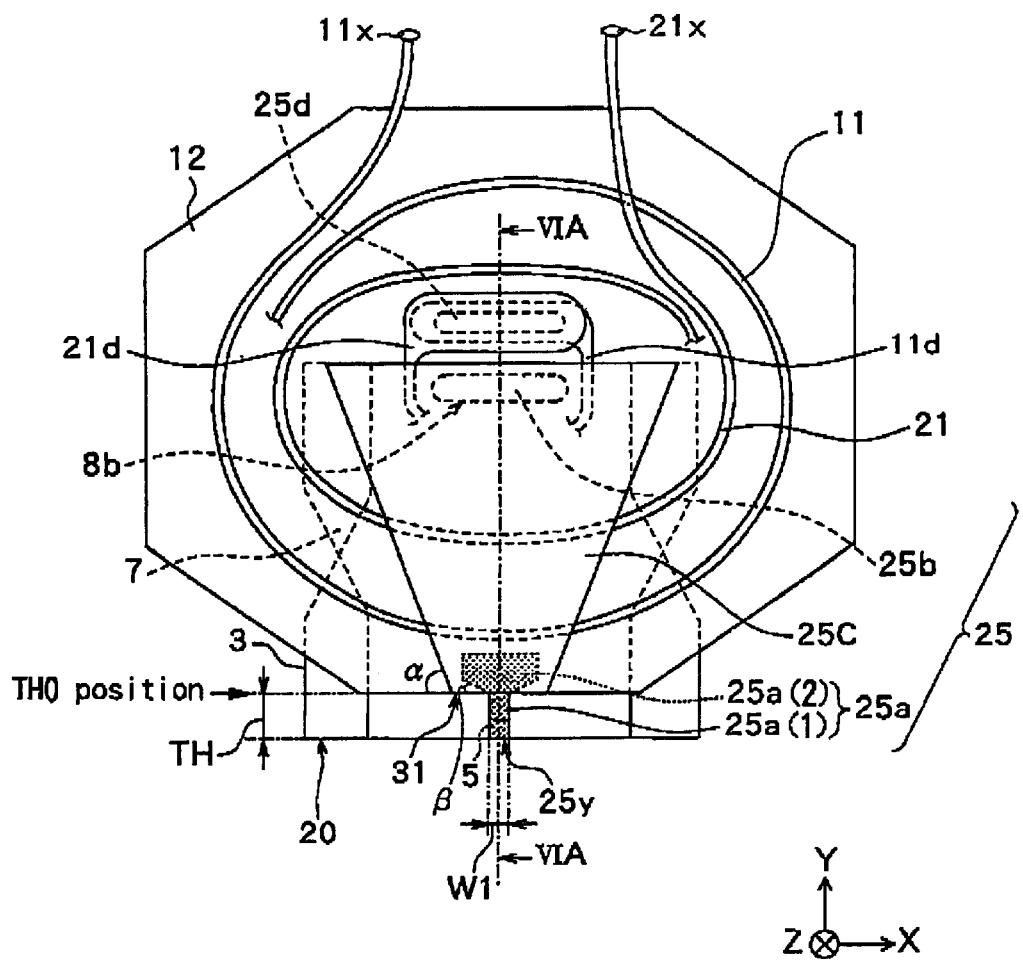
FIG. 7 is a plan view of a planar structure of a thin film magnetic head according to a first embodiment of the invention.

FIG. 7 shows a schematic representation of a planar structure of the thin film magnetic head manufactured by the method of manufacturing a thin film magnetic head according to the embodiment. The insulating films 22 and 26, the overcoat layer 27 and so on are not shown in FIG. 7. FIG. 7 shows the thin film coils 11 and 21 but shows their outermost periphery portions alone, and FIG. 7 shows the insulating film 12 but shows its outermost end alone. FIG. 6A corresponds to a cross section viewed from the direction of the arrows along the line VIA—VIA of FIG. 7.

As shown in FIG. 7, the position of the most front end of the insulating film 12 is the reference position for determining the throat height (TH), namely, the throat height zero position (hereinafter referred to as "the TH0 position"). The throat height (TH) is defined as a length between the position of a closest-to-the-air-bearing-surface-20 edge of the insulating layer (the insulating films 12, 22 and 26) for electrically isolating the thin film coils 11 and 21 and the position of the air bearing surface 20. The insulating layer consisting of the insulating films 12, 22 and 26 electrically isolates the thin film coils 11 and 21 for generating a magnetic flux from the other portions, i.e., the position (the TH0 position) of the most front end of the insulating film 12.

The top pole 25 includes the top pole chip 25a, the magnetic path forming pattern 25b and the top yoke 25c. In other words, the top pole 25 comprises a collection of the above-mentioned portions which are separately formed.

For example, the top yoke 25c has a trapezoidal planar shape, and the width thereof is gradually narrower as it is closer to the air bearing surface 20. The width of a front edge of the top yoke 25c is greater than the width of the intermediate portion 25a(2) of the top pole chip 25a to be described later. However, the width of the front edge of the top yoke 25c is not necessarily limited to this case, and, for example, the width of the front edge of the top yoke 25c may be smaller than the width of the intermediate portion 25a(2). Preferably, an angle $\alpha$ which a side edge of the top yoke 25c forms with a surface parallel to the air bearing surface 20 is within a range of, for example, about 20 degrees to 60 degrees. For example, the position of the front edge surface 31 of the top yoke 25c matches the TH0 position. However, the position of the edge surface 31 is not necessarily limited to this case, and, for example, the position of the edge surface 31 may be shifted frontward or rearward from the TH0 position.

For example, the top pole chip 25a has a T-shaped planar shape and includes the tip portion 25a(1) and the intermediate portion 25a(2) which are arranged in this order when being viewed from the side of the air bearing surface 20. The tip portion 25a(1) has a uniform width in the length direction thereof, and the width defines a write track width on a recording medium. A rearward portion of the intermediate portion 25a(2) has a uniform width greater than the width of the tip portion 25a(1), and a frontward portion of the intermediate portion 25a(2) is gradually narrower as it is closer to the air bearing surface 20. At a coupling portion between the tip portion 25a(1) and the intermediate portion 25a(2), an angle $\beta$ which an outer edge of the frontward portion of the intermediate portion 25a(2) forms with the surface parallel to the air bearing surface 20 is, for example, about 45 degrees. For example, the position of the coupling portion between the tip portion 25a(1) and the intermediate portion 25a(2) matches the TH0 position. However, the position of the coupling portion is not necessarily limited to this case, and, for example, the position of the coupling portion may be shifted frontward or rearward from the TH0 position. The centers of the top yoke 25c and the top pole chip 25a in the width directions thereof match each other.

As shown in FIGS, 6A, 6B and 7, for example, a front part of the top yoke 25c partly overlaps and is magnetically coupled to the intermediate portion 25a(2) of the top pole chip 25a. The top yoke 25c is also magnetically coupled to the bottom pole 7 through the magnetic path forming pattern 25b in the opening 8b.

Each of the thin film coils 11 and 21 comprises a spiral having a planar shape. The respective inner periphery ends of the thin film coils 11 and 21 are electrically connected to each other through the coil connecting portion 11d, the connecting intermediate pattern 25d and the coil connecting portion 21d. Outer terminals 11x and 21x of the thin film coils 11 and 21 are connected to an external circuit (not shown), and the external circuit allows a current to pass through the thin film coils 11 and 21.

As can be seen from FIGS. 6A, 6B and 7, the tip portion 25a(1) of the top pole chip 25a extends on the flat write gap layer 8, and the intermediate portion 25a(2) thereof extends on the front inclined surface of the insulating film 12.

<Functions of Thin Film Magnetic Head>

Figure 8A:
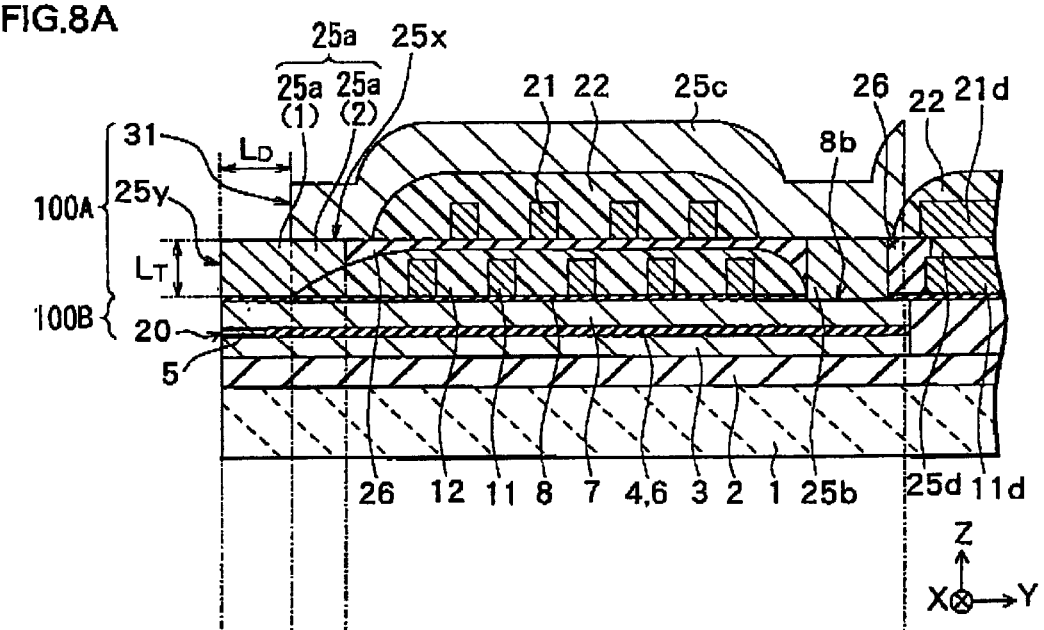
FIGS. 8A and 8B show a sectional structure of a completed thin film magnetic head and planar structures of a top pole chip and a top yoke, respectively.
Figure 8B:
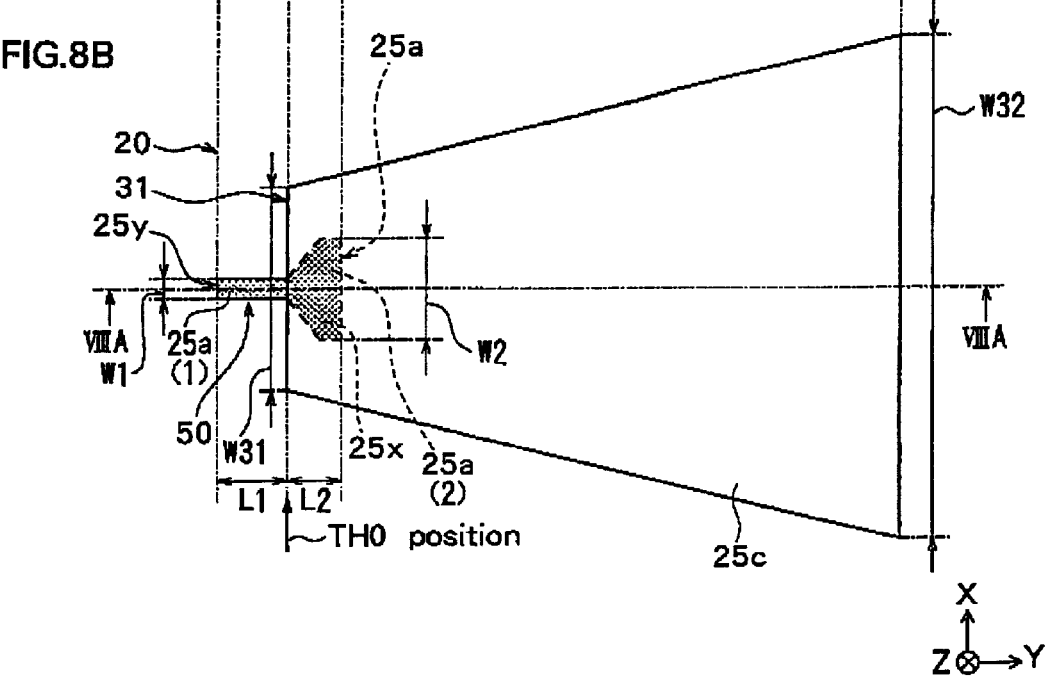

Next, fictions of the thin Mm magnetic head according to the embodiment will be described with reference to FIGS. 8A and 8B. FIG. 8B shows a planar structure of a principal part of the completed thin film magnetic head, and FIG. 8A shows a sectional structure viewed from the direction of the arrows along the line VIIIA—VIIIA of FIG. 8B. FIG. 8A does not show the overcoat layer 27, and FIG. 8B does not show the elements other than the top pole chip 25a and the top yoke 25c. In FIGS. 8A and 8B, the same parts as the elements shown in FIGS. 6A, 6B and 7 are indicated by the same reference numerals.

As shown in FIG. 8A, the thin film magnetic head according to the embodiment is a composite thin film magnetic head having an integrated structure comprising a recording head 100A for recording information on a recording medium and a reproducing head 100B for reproducing information recorded on the recording medium, Firstly, the brief description is given below with regard to basic operations of the thin film magnetic head, namely, a recording operation of the recording head 100A for recording information on the recording medium and a reproducing operation of the reproducing head 100B for reproducing information from the recording medium.

At the time of recording, when the eternal circuit (not shown) causes a current to pass through the thin film coils 11 and 21 of the recording head 100A, a magnetic flux is generated in response to the current. The generated magnetic flux propagates frontward through the top yoke 25c, and propagates to the tip portion 25a(1) via the intermediate portion 25a(2) of the top pole chip 25a magnetically coupled to the top yoke 25c. The magnetic flux that propagates to the tip portion 25a(1) further propagates and reaches to a tip of the tip portion 25a(1) close to the air bearing surface 20, and thus the magnetic flux generates a signal magnetic field for recording to the outside near the write gap layer 8. The signal magnetic field partly magnetizes a magnetic recording medium, thereby enabling information to be recorded on the magnetic recording medium. The magnetic flux generated by the thin film coils 11 and 21 must be smoothly, sufficiently supplied to the tip of the tip portion 25a(1) in order that the thin film magnetic head for performing the above-described recording operation may ensure excellent overwrite characteristics.

On the other hand, at the time of reproducing, a sense current is passed through the MR film 5 of the reproducing head 100B. Since the resistance of the MR film 5 changes in response to a reproducing signal magnetic field from the magnetic recording medium, information recorded on the magnetic recording medium can be read out by detecting the resistance change according to a change in the sense current.

In the thin film magnetic head according to the embodiment, the widths of the top yoke 25c, the intermediate portion 25a(2) and the tip portion 25a(1), which constitute a propagation path of a magnetic flux, are narrowed in stages, and thus the allowable amount of magnetic flux capable of being contained within the above-mentioned portions, i.e., the magnetic volume, is reduced in stages. Thus, as the magnetic flux generated by the thin film coils 11 and 21 propagates through the above-mentioned portions, the magnetic flux is focused in stages in accordance with a decrease in the magnetic volumes of the portions and reaches to a tip surface 25y of the tip portion 25a(1) without being saturated during propagation The above-described appropriate control of the magnetic volumes of the portions constituting the propagation path of the magnetic flux is one of important viewpoints for improving overwrite characteristics.

Next, the characteristic correlation between the structure of the thin film magnetic head according to the embodiment and the recording characteristics thereof will be described with reference to FIGS. 8A and 8B.

The description is now given in sequence with regard to an influence of the thickness $L_T$ of the top pole chip 25a shown in FIGS. 8A and 8B (hereinafter sometimes called "the thickness $L_T$") and the distance $L_D$ between the position of the front edge surface 31 of the top yoke 25c and the position of the air bearing surface 20 (hereinafter sometimes called "the distance $L_D$") upon side erase characteristics and overwrite characteristics of the thin film magnetic head.

The following description is given with regard to the case in which both the thickness $L_T$ and the distance $L_D$ are changed when the position of the top pole chip 25a and the dimensions of the tip portion 25a(1) and the intermediate portion 25a(2) of the top pole chip 25a in the width and length directions of the portions 25a(1) and 25a(2) are fixed.

Firstly, the description is given with regard to the correlation between the thickness $L_T$ and distance $L_D$ and the side erase characteristics.

Figure 9:
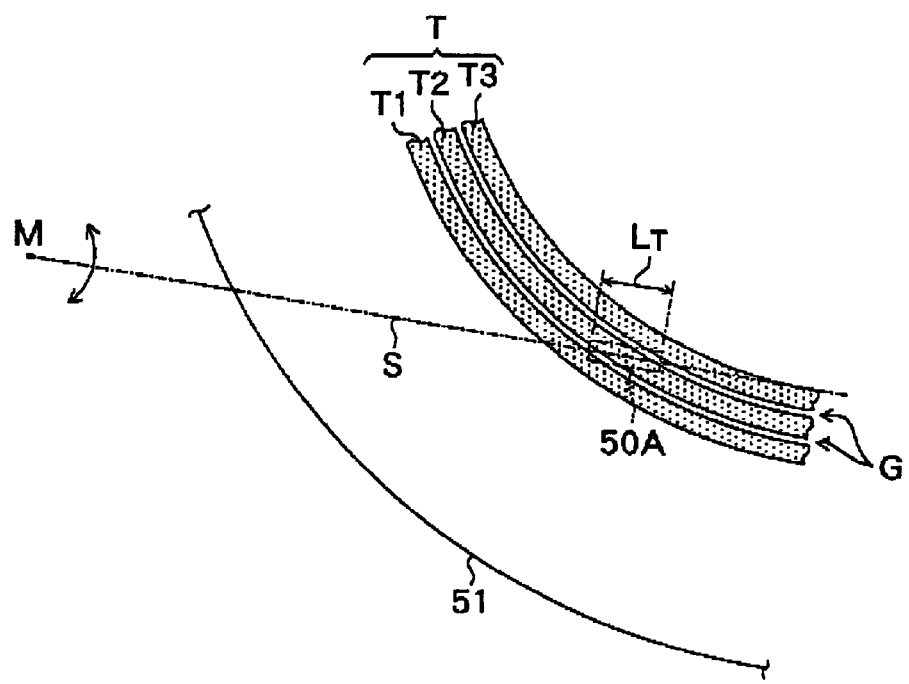
FIG. 9 is an illustration for describing the correlation between a thickness of the top pole chip and side erase characteristics.
Figure 10:
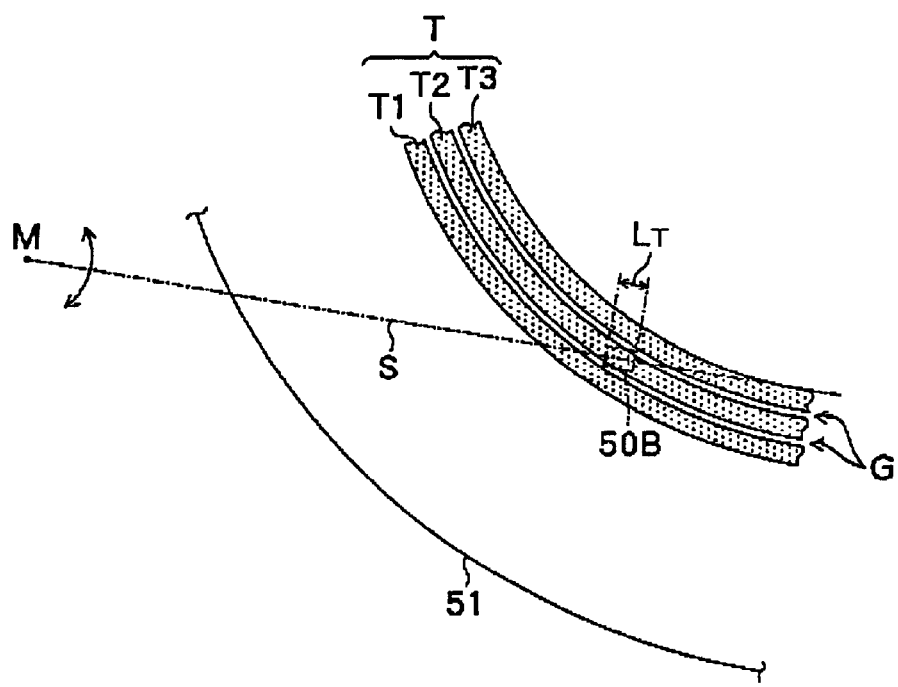
FIG. 10 is an illustration of a comparison to FIG. 9.

FIGS. 9 and 10 show the relative positions of a tip surface region of the pole portion 50 of the thin film magnetic head and a track region of a recording medium such as a magnetic disk, particularly to give the detailed description of the correlation between the thickness $L_T$ and the side erase characteristics, On a line segment S in FIGS. 9 and 10, an arm (not shown) is formed and can rotate around a pivot M. A head slider (not shown) on which the thin film magnetic head is mounted is provided on a tip of the arm (an end opposite to the pivot My. Rotation of the arm allows the head slider to move on the recording medium, and thus the pole portion 50 of the thin film magnetic head performs the writing of information on a predetermined track region T on the recording medium.

T1 to T3 represent track regions of an arbitrary track region T on, for example, a recording medium 51, which are shown in enlarged view. For instance, a gap region G is provided between the track regions. FIGS. 9 and 10 show only parts of both an outer edge of the recording medium 51 and the track region T. A region 50A shown in FIG. 9 is a region in which a tip surface of the pole portion 50 is located.

To record information on the recording medium 51, a direction of the region 50A (the thickness direction of the pole portion 50) does not, in general, necessarily match a tangential direction of the track region T (e.g., T2), as shown in FIG. 9. When the thickness $L_T$ is greater and thus the tip surface of the pole portion 50 is wider than necessary in the thickness direction, the region 50A extends to the track regions T1 and T3 adjacent to the track region T2 as shown in FIG. 9, and thus the side erase occurs. In other words, the side erase characteristics deteriorate. On the other hand, the smaller thickness $L_T$ can avoid a region 50B from extending to the track regions T1 and T3 as shown in FIG. 10, and thus the side erase does not occur. In other words, the side erase characteristics improve.

The shorter distance $L_D$ causes the front edge surface 31 of the top yoke 25c to be closer to the air bearing surface 20. More particularly, when the edge surface 31 is too close to the air bearing surface 20, a magnetic flux ejected through the edge surface 31 reaches the recording medium, and thus the magnetic flux causes the side erase. In short, the side erase characteristics deteriorate. On the other hand, the longer distance $L_D$ causes less ejection of magnetic flux from the edge surface 31, and therefore the side erase characteristics improve.

Next, the description is given in sequence with regard to the correlation between the thickness $L_T$ and distance $L_D$ and the overwrite characteristics.

The greater thickness $L_T$ causes a higher magnetic volume of the tip portion 25a(1) and also a larger amount of magnetic flux flowing into the tip portion 25a(1) and reaching to the tip surface 25y, and thus the overwrite characteristics improve. On the other hand, the smaller thickness $L_T$ causes a lower magnetic volume of the tip portion 25a(1)

and also a smaller amount of magnetic flux flowing into the tip portion 25a(1) and reaching to the tip surface 25y, and thus the overwrite characteristics deteriorate.

The longer distance $L_D$ causes a smaller area of a coupling surface 25x of the top pole chip 25a and the top yoke 25c and thus limits the flow of magnetic flux from the top yoke 25c into the top pole chip 25a, and consequently the overwrite characteristics deteriorate. On the other hand, the shorter distance $L_D$ causes a larger area of the coupling surface 25x of the top pole chip 25a and the top yoke 25c and thus a larger amount of magnetic flux flowing from the top yoke 25c into the top pole chip 25a, and therefore the overwrite characteristics improve.

As described above, the side erase characteristics deteriorate and the overwrite characteristics improve when the thickness $L_T$ increases, and the side erase characteristics improve and the overwrite characteristics deteriorate when the thickness $L_T$ decreases. The side erase characteristics improve and the overwrite characteristics deteriorate when the distance $L_D$ increases, and the side erase characteristics deteriorate and the overwrite characteristics improve when the distance $L_D$ decreases. In other words, both the characteristics have a tradeoff relationship. Therefore, both the thickness $L_T$ and the distance $L_D$ must be optimized in order to improve both the side erase characteristics and the overwrite characteristics during recording.

EXAMPLES

Next, specific examples of the invention will be described.

Example 1

Composite thin film magnetic heads were manufactured by using the above-described method of manufacturing a thin film magnetic head. Permalloy (Ni: 80 wt %, Fe: 20 wt %; a saturation flux density Bs=1.0T(tesla)) was used as the materials of the top pole chip 25a, the magnetic path forming pattern 25b and the top yoke 25c. The planar shapes of the top pole chip 25a and the top yoke 25c were the same as the planar shapes shown in FIG. 8B, and the dimensions of the top pole chip 25a and the top yoke 25c were as follows. Incidentally, a length L3 of the top yoke 25c described below was obtained in a state shown in FIGS. 8A and 8B, namely, when the position of the front edge surface 31 of the top yoke 25c was matched to the TH0 position.

A width W1 of the tip portion 25a(1) was equal to 0.8 82 m.

A width W2 of the intermediate portion 25a(2) was equal to 4.0 82 m.

A width W31 of a front edge of the top yoke 25c was equal to 3.0 μm.

A width W32 of a rear edge of the top yoke 25c was equal to 30.0 μm.

A length L1 of the tip portion 25a(1) was equal to 1.5 μm.

A length L2 of the intermediate portion 25a(2) was equal to 3.0 μm.

A length L3 of the top yoke 25c was equal to 30.0 μm.

The top pole chip 25a and the top yoke 25c were formed, provided that the thickness $L_T$ (μm) of the top pole chip 26a and the distance $L_D$ (μm) between the position of the front edge surface 31 of the top yoke 25c and the position of the air bearing surface 20, shown in FIGS. 8A and 8B, were changed. Thus, a plurality of thin film magnetic heads having the combinations of the thicknesses $L_T$ and the distances $L_D$ were manufactured. Table 1 shows the above-mentioned thicknesses $L_T$ and distances $L_D$ of the manufactured thin film magnetic heads. As shown in Table 1, in the example, the thin film magnetic heads were manufactured, provided that the thicknesses $L_T$ varied by 0.5 μm within a range of 0.5 μm to 3.5 μm and the distances $L_D$ varied by 0.5 μm within a range of 0 μm to 4.0 μm. The top pole chips 25a of all the thin film magnetic heads had the same shape, the top yokes 25c thereof had the same shape, and also the other elements thereof had the same structural features.

TABLE 1

Unit (%)

| | | $L_T$ (μm) | | | | | | |
|---|---|---|---|---|---|---|---|---|
| | | 0.5 | 1.0 | 1.5 | 2.0 | 2.5 | 3.0 | 3.5 |
| $L_D$ | 0.0 | 100 | 97 | 94 | 91 | 89 | 85 | 80 |
| (μm) | 0.5 | 100 | 98 | 96 | 94 | 92 | 87 | 83 |
| | 1.0 | 100 | 100 | 98 | 95 | 95 | 90 | 85 |
| | 1.5 | 100 | 100 | 100 | 98 | 98 | 94 | 88 |
| | 2.0 | 100 | 100 | 100 | 100 | 100 | 95 | 90 |
| | 2.5 | 100 | 100 | 100 | 100 | 100 | 97 | 92 |
| | 3.0 | 100 | 100 | 100 | 100 | 100 | 98 | 95 |
| | 3.5 | 100 | 100 | 100 | 100 | 100 | 100 | 100 |
| | 4.0 | 100 | 100 | 100 | 100 | 100 | 100 | 100 |

After a plurality of thin film magnetic heads were manufactured, the side erase characteristics were, first, examined by using the thin film magnetic heads. Evaluations of the side erase characteristics were carried out in the following manner. Magnetic data 'A' was previously recorded on a predetermined track region (hereinafter referred to as "a target track region") on a recording medium, and then the percentage of remaining magnetic data on the target track region was measured after new magnetic data 'B' was recorded on one and the other track regions adjacent to the target track region by using the thin film magnetic heads, that is, the proportion of the magnetic data 'A' remaining without being overwritten (side-erased) was measured after about 200 repetitions of recording of the new magnetic data 'B'. In Table 1, numeric values listed at intersections of columns of the thicknesses $L_T$ and rows of the distances $L_D$ are the percentages of remaining (%) measured by performing the above-described evaluations using the thin film magnetic heads. The numeric values listed in Table 1 are data of either the percentage of remaining measured after recording of new magnetic data on one track region adjacent to the target track region or the percentage of remaining measured after recording of new magnetic data on the other adjacent track region, specifically, data of the lower one of both the percentages.

Figure 11:
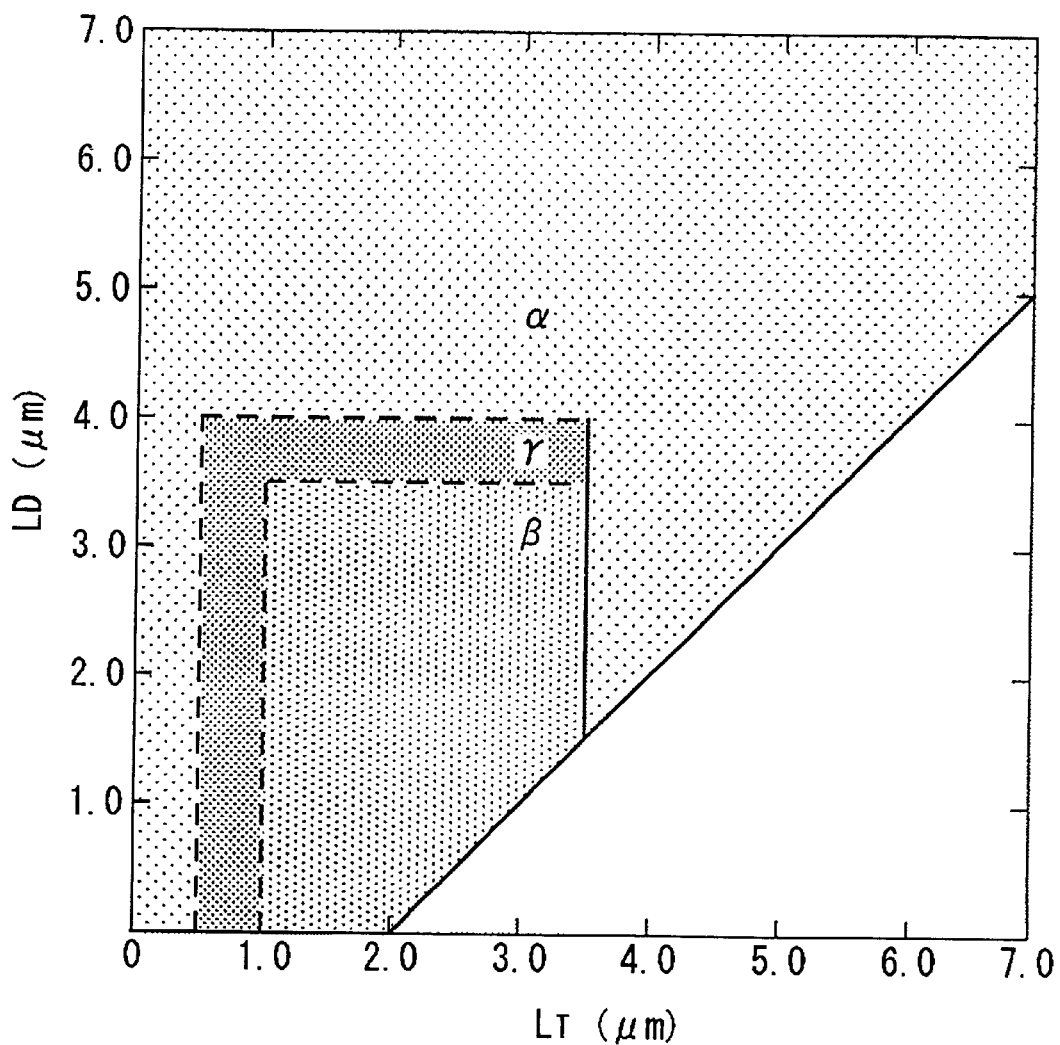
FIG. 11 is an illustration showing a range of the preferable distance $L_D$ and the thickness $L_T$ considering side erase characteristics and overwrite characteristics.

From the results shown in Table 1, it has been shown that, when Permalloy (Ni: 80 wt %, Fe: 20 wt %; Bs=1.0T) is used as the materials of the top pole chip 25a, the top yoke 25c and so on, a thin film magnetic head having such good side erase characteristics that the percentage of remaining reaches a practicable level (90% or more) can be obtained within a range surrounded by a thick line in Table 1, i.e., within a range in which the thickness $L_T$ and the distance $L_D$ satisfy the following equation (1). The above-mentioned thin film magnetic head realizes good recording performance without occurrence of side erase. The range of the distance $L_D$ and the thickness $L_T$ that satisfy the following equation (1) are expressed as an area α (a light shaded area including areas β, γ) in an area illustration of the distance $L_D$ and the thickness $L_T$ that are shown in FIG. 11. The FIG. 11 describes the range of the distance $L_D$ and the thickness $L_T$ concerning the side erase characteristics and the overwrite characteristics. A "vertical axis" and a "lateral axis" in FIG. 11 show the distance $L_D$ (μm) and the thickness $L_T$ (μm), respectively.

$$L_D \geq L_T - 2.0 \quad (L_D \geq 0, L_T > 0) \tag{1}$$

Preferably, the distance $L_D$ is, however, within a range expressed by the following equation (2), because the distance $L_D$ exceeding the above-mentioned upper limit value causes too small an area of the coupling surface 25x, thus limits the flow of magnetic flux from the top yoke 25c into the top pole chip 25a and thus does not permit overwriting on a desired track region on a recording medium.

$$0 \leq L_D \leq 4.0 \tag{2}$$

Preferably, the thickness $L_T$ is within a range expressed by the following equation (3), because the thickness $L_T$ below the above-mentioned lowest value causes too low a magnetic volume of the tip portion 25a(1), thus causes an insufficient amount of magnetic flux reaching to the tip of the tip portion 25a(1) and thus causes poor performance of writing on a desired track region on a recording medium, and because the thickness $L_T$ exceeding the above-mentioned highest value causes noticeable writing on an adjacent track region and thus causes the occurrence of side erase.

$$0.5 \leq L_T \leq 3.5 \tag{3}$$

Next, the overwrite characteristics were evaluated by using the above-mentioned thin film magnetic heads. Evaluations of the overwrite characteristics were carried out in the following manner. First, magnetic data 'C' was recorded on a predetermined track region on a recording medium by using a relatively low frequency of about 20 MHz, and thereafter the magnetic data 'C' was reproduced. Then, a reproduced waveform was subjected to frequency analysis (spectral analysis), and thus reproduced output S1 of a 20-MHz band was measured. Next, the magnetic data 'C' was overwritten with new magnetic data 'D' by using a relatively high frequency of about 120 MHz, and thereafter the magnetic data was reproduced by using the recording medium on which the magnetic data was overwritten. Then, the analysis was performed as in the above-mentioned case, and reproduced output S2 of the 20-MHz band after overwriting was measured. Finally, the output ratio between the reproduced output S1 and the reproduced output S2 was calculated as an overwrite characteristics value. The results of evaluations are shown in Table 2. In Table 2, numeric values listed at intersections of columns of the thicknesses $L_T$ and rows of the distances $L_D$ are the overwrite characteristics values (dB) calculated by performing the above-described evaluations using the thin film magnetic heads.

TABLE 2

Unit (dB)

| | | $L_T$ (μm) | | | | | | |
|---|---|---|---|---|---|---|---|---|
| | | 0.5 | 1.0 | 1.5 | 2.0 | 2.5 | 3.0 | 3.5 |
| $L_D$ (μm) | 0.0 | 18 | 23 | 28 | 32 | 34 | 36 | 38 |
| | 0.5 | 18 | 23 | 27 | 31 | 32 | 34 | 36 |
| | 1.0 | 17 | 22 | 27 | 30 | 31 | 32 | 34 |
| | 1.5 | 17 | 22 | 26 | 28 | 30 | 31 | 32 |
| | 2.0 | 16 | 21 | 26 | 27 | 28 | 30 | 31 |
| | 2.5 | 16 | 21 | 25 | 26 | 27 | 28 | 30 |
| | 3.0 | 15 | 20 | 25 | 25 | 26 | 26 | 27 |

TABLE 2-continued

Unit (dB)

| | $L_T$ (μm) | | | | | | |
|---|---|---|---|---|---|---|---|
| | 0.5 | 1.0 | 1.5 | 2.0 | 2.5 | 3.0 | 3.5 |
| 3.5 | 10 | 15 | 20 | 22 | 22 | 24 | 24 |
| 4.0 | 5 | 10 | 15 | 15 | 17 | 17 | 19 |

From the results shown in Table 2, it has been shown that, when Permalloy (Ni: 80 wt %, Fe: 20 wt %; Bs=1.0T) is used as the materials of the top pole chip 25a, the top yoke 25c and so on, a thin film magnetic head having good overwrite characteristics at a practicable level (e.g., 25 dB or more) can be obtained within a range surrounded by a thick line in Table 2, i.e., within a range in which the thickness $L_T$ and the distance $L_D$ satisfy the following equations (4) and (5). The above-mentioned thin film magnetic head enables good overwrite recording. In Table 2, the overwrite characteristics values in a range of $L_T > 3.5$ are not listed.

$$0 \leq L_D < 3.5 \tag{4}$$

$$L_T > 1.0 \tag{5}$$

From the results of the equations (1) to (5), it has been shown that, when Permalloy (Ni: 80 wt %, Fe: 20 wt %; Bs=1.0T) is used as the materials of the top pole chip 25a, the top yoke 25c and so on, a thin film magnetic head having the practicable-level side erase characteristics and overwrite characteristics can be obtained within an overlapping portion of the ranges surrounded by the thick lines in Tables 1 and 2, i.e., when the following equations (6) to (8) are satisfied. The range of the distance $L_D$ and the thickness $L_T$ that satisfy the following equations (6) to (8) is expressed as an area β (a middle dark shaded area) in the illustration shown in FIG. 11. Referring to FIG. 11, when a saturation magnetic flux density of a material of the pole tip 25a and the top yoke 25c and so on is Bs, it is apparent that the minimum value $L_{Tmin}$ of the thickness $L_T$ satisfies the following equation (9), and the maximum value $L_{Dmax}$ of the distance $L_D$ satisfies the following equation (10). In a borderline of the area β, a solid borderline means that the line includes the corresponding value, whereas a broken borderline means that the line does not include the corresponding value. In the area γ which is to be described later, the described solid and broken lines have the same meanings as in the area β, too.

$$L_D \geq L_T - 2.0 \tag{6}$$

$$1.0 < L_T \leq 3.5 \tag{7}$$

$$0 \leq L_D < 3.5 \tag{8}$$

$$L_{Tmin} = -0.5Bs + 1.5 \tag{9}$$

$$L_{Dmax} = 0.5Bs + 3.0 \tag{10}$$

Preferably, the thickness $L_T$ is within a range expressed by the following equation (11), because the thickness $L_T$ exceeding the above-mentioned highest value causes a problem: it is difficult to form the top pole chip 25a with high accuracy. The reason is as follows, That is, in the example in which the top pole chip 25a is formed by frame plating so that the width of the tip portion 25a(1) may be less than 1.0 μm, a photoresist film having about the same thickness is required in order to form the top pole chip 25a having the thickness $L_T$ of 3.5 μm or more. When an attempt is made to selectively expose an extremely minute region of the photoresist film corresponding to the tip portion 25a(1) by photolithography, an exposed region increases because the photoresist film is too thick. As a consequence, a frame for fining the top pole chip 25a cannot be formed with high accuracy. To consider the accuracy in forming the above-mentioned top pole chip 25a as well as to ensure excellent characteristics (side erase characteristics and overwrite characteristics), it is therefore more preferable that the thickness $L_T$ be within a range expressed by the following equation (12) in additional consideration of the range of $L_T$ expressed by the equation (11).

$$0 < L_T < 3.5 \tag{11}$$

$$1.0 < L_T < 3.5 \tag{12}$$

Example 2

A plurality of thin film magnetic heads were manufactured in the same maser as the above-described example 1, except that iron nitride (FeN; Bs=2.0T) was used as the materials of the top pole chip 25a, the top yoke 25c and so on. Predetermined-track write characteristics and overwrite characteristics of the thin film magnetic heads were examined in the same manner as the example 1. The results of evaluations of both the above-mentioned characteristics of an example 2 are shown in Tables 3 and 4.

TABLE 3

Unit (%)

| | | $L_T$ (μm) | | | | | |
|---|---|---|---|---|---|---|---|
| | | 0.5 | 1.0 | 1.5 | 2.0 | 2.5 | 3.0 | 3.5 |
| $L_D$ (μm) | 0.0 | 100 | 96 | 93 | 90 | 88 | 86 | 80 |
| | 0.5 | 100 | 98 | 96 | 93 | 92 | 87 | 82 |
| | 1.0 | 100 | 100 | 98 | 96 | 93 | 91 | 86 |
| | 1.5 | 100 | 100 | 100 | 96 | 95 | 92 | 88 |
| | 2.0 | 100 | 100 | 100 | 100 | 98 | 95 | 90 |
| | 2.5 | 100 | 100 | 100 | 100 | 100 | 98 | 91 |
| | 3.0 | 100 | 100 | 100 | 100 | 100 | 98 | 92 |
| | 3.5 | 100 | 100 | 100 | 100 | 100 | 100 | 95 |
| | 4.0 | 100 | 100 | 100 | 100 | 100 | 100 | 100 |

TABLE 4

Unit (dB)

| | | $L_T$ (μm) | | | | | |
|---|---|---|---|---|---|---|---|
| | | 0.5 | 1.0 | 1.5 | 2.0 | 2.5 | 3.0 | 3.5 |
| $L_D$ (μm) | 0.0 | 24 | 30 | 32 | 34 | 38 | 38 | 41 |
| | 0.5 | 24 | 28 | 31 | 34 | 37 | 37 | 38 |
| | 1.0 | 22 | 28 | 29 | 82 | 34 | 35 | 38 |
| | 1.5 | 22 | 27 | 28 | 30 | 32 | 33 | 34 |
| | 2.0 | 21 | 27 | 28 | 28 | 31 | 31 | 33 |
| | 2.5 | 21 | 26 | 26 | 27 | 29 | 30 | 30 |
| | 3.0 | 20 | 25 | 25 | 27 | 27 | 28 | 30 |
| | 3.5 | 20 | 25 | 25 | 26 | 27 | 27 | 28 |
| | 4.0 | 18 | 20 | 20 | 21 | 23 | 23 | 24 |

From the results shown in Table 3, it has been shown that, also when iron nitride (Bs=2.0T) is used as the materials of the top pole chip 25a, the top yoke 25c and so on, a thin film magnetic head having such good predetermined-track write characteristics that the percentage of remaining reaches a practicable level (90% or more) can be obtained within a range (area α in FIG. 11) surrounded by a thick line in Table 3, i.e., within a range in which the thickness $L_T$ and the distance $L_D$ satisfy the following equation (13). The above-mentioned thin film magnetic head enables good recording having the prevented occurrence of side erase. Also in this case, for the same reason as in the case of the above-described example 1, it is preferable that the distance $L_D$ and the thickness $L_T$ are within ranges expressed by the following equations (14) and (15), respectively.

$$L_D \geq L_T - 2.0 \ (L_D \geq 0, L_T > 0) \tag{13}$$

$$0 \leq L_D \leq 4.0 \tag{14}$$

$$0.5 \leq L_T \leq 3.5 \tag{15}$$

From the results shown in Table 4, it has been shown that, when iron nitride is used as the materials of the top pole chip 25a, the top yoke 25c and so on, a thin film magnetic head having such good overwrite characteristics that the overwrite characteristics value reaches a practicable level (25 dB or more) can be obtained within a range surrounded by a thick line in Table 4, i.e., within a range in which the thickness $L_T$ and the distance $L_D$ satisfy the following equations (16) and (17). The above-mentioned thin am magnetic head enables good overwrite recording. In Table 4, the overwrite characteristics values in a range of $L_T > 3.5$ are not listed.

$$0 \leq L_D < 4.0 \tag{16}$$

$$L_T > 0.5 \tag{17}$$

From the results of the equations (13) to (17), it has been shown that, when iron nitride (Bs=2.0T) is used as the materials of the top pole chip 25a, the top yoke 25c and so on, a thin film magnetic head having the practicable-level side erase characteristics and overwrite characteristics can be obtained within an overlapping portion of the ranges surrounded by the thick lines in Tables 3 and 4, i.e., when the following equations (18) to (20) are satisfied. The area of the distance $L_D$ and the thickness $L_T$ that satisfy the following equations (18) to (20) is expressed as the area γ (a dark shaded area including the area β), in the area illustration shown in FIG. 11. In this case, FIG. 11 also shows that the minimum value of the thickness $L_T$ and the maximum value $L_{Dmax}$ of the distance $L_D$ satisfy the above equations (9), (10), respectively.

$$L_D \geq L_T - 2.0 \tag{18}$$

$$0.5 < L_T \leq 3.5 \tag{19}$$

$$0 \leq L_D < 4.0 \tag{20}$$

Also in this case, as in the case of the above-described example 1, to consider the accuracy in forming the top pole chip 25a, it is preferable that the thickness $L_T$ be within a range expressed by the following equation (21). To consider the accuracy in forming the top pole chip 25a as well as to ensure excellent characteristics (side erase characteristics and overwrite characteristics), it is therefore more preferable that the thickness $L_T$ is within a range expressed by the following equation (22) in additional consideration of the range of $L_T$ expressed by the equation (11).

$$0 < L_T < 3.5 \tag{21}$$

$$0.5 < L_T < 3.5 \tag{22}$$

Further, as the material of the top pole chip 25a and the top yoke 25c, it is possible to use the other magnetic materials having a relatively high saturation flux density as is the case with Permalloy (Ni: 80 wt %, Fe: 20 wt %; Bs=1.0T) used in the example 1, or iron nitride (Bs=2.0T) used in the example 2. The other magnetic materials includes, for example, Permalloy (Ni: 50 wt %, Fe: 50 wt %; Bs=1.5T), iron-cobalt-nickel-iron alloy oxide (FeCoZrO; Be=2.0T), cobalt-nickel-iron alloy (CoNiFe; Bs=1.8T), iron-cobalt alloy (FeCo; Bs=2.4T), iron-aluminum alloy nitride (FeAlN; Bs=2.0T), iron-cobalt-molibdenum alloy (FeCoMo; Bs=2.2T) and so on. When using the described materials, it is also preferable that the described equations (1) to (22) referring to the thickness $L_T$ and the distance $L_D$ be satisfied, the equations being derived from the described embodiments in which Permalloy and iron nitride are used.

As described above, according to the thin film magnetic head and the method of manufacturing the same according to the above-described embodiment and examples, both the thickness $L_T$ of the top pole chip 25a and the distance $L_D$ between the position of the front edge surface 31 of the top yoke 25c and the position of the air bearing surface 20, both of which have an influence upon the side erase characteristics and overwrite characteristics of the thin film magnetic head, are optimized. Therefore, the practicable side erase characteristics and overwrite characteristics can be ensured, and furthermore the top pole chip 25a can be formed with high accuracy.

Incidentally, the distance $L_D$, the thickness $L_T$, the minimum value $L_{Tmin}$ of the thickness $L_T$ and the maximum value $L_{Dmax}$ of the distance $L_D$ do not necessarily have to satisfy the above equations (2) to (5), (7) to (12), (14) to (17) and (19) to (22) and be within the above-mentioned ranges. The thickness $L_T$ and the distance $L_D$ may depart from the above equations or the above-mentioned ranges, when the above-mentioned characteristics and the accuracy in forming the top pole chip 25a do not become a problem in practical use or actual manufacturing.

Although the invention has been described above by referring to the embodiment and examples, the invention is not limited to the above-described embodiment and examples and various modifications of the invention are possible. For example, the planar shapes of the top pole chip 25a and the top yoke 25c are not limited to the planar shapes shown in FIG. 8B, and the planar shapes thereof can be freely changed as long as they can allow a magnetic flux generated by the thin film coils 11 and 21 to sufficiently reach to the tip of the tip portion 25a(1).

In the above-described embodiment and examples, Permalloy (Ni: 80 wt %, Fe 20 wt %) or iron nitride is used as the materials of the top pole chip 26a, the top yoke 26c and so on, but the materials are not necessarily limited to these embodiment and examples. For example, Permalloy (Ni: 50 wt %, Fe: 50 wt %) or an amorphous alloy such as zirconium-cobalt-iron (FeCoZr) may be used, or a stacking combination of two or more kinds of these materials may be used.

For example, although the method of manufacturing a composite thin film magnetic head has been described in the above-mentioned embodiment, the invention can be applied to a record-only thin film magnetic head having an inductive magnetic transducer for writing or a thin mm magnetic head having an inductive magnetic transducer for both recording and reproducing. Moreover, the invention can be applied to a thin film magnetic head having the structure in which the element for writing and the element for reading are stacked in reverse order.

As described above, according to the thin film magnetic head and the method of manufacturing a thin film magnetic head of the invention, the distance $L_D$ ($\mu$m) between the position of the edge of the second magnetic layer portion closest to the recording-medium-facing surface and the position of the recording-medium-facing surface and the thickness $L_T$ ($\mu$m) of a portion of the first magnetic layer portion exposed to the recording-medium-facing surface satisfy $L_D \geq L_T - 2.0$ ($\mu$m). Therefore, the above-mentioned distance $L_D$ and thickness $L_T$ having an influence upon predetermined-track write characteristics of the thin film magnetic head are optimized, and thus the occurrence of side erase during recording can be prevented.

Particularly, when the distance $L_D$ is within a range of $0 \leq L_D < 3.5$ ($\mu$m) and the thickness $L_T$ is within a range of $1.0$ ($\mu$m)$< L_T \leq 3.5$ ($\mu$m) and a nickel-iron alloy is used as a material of the one magnetic layer, the above-mentioned distance $L_D$ and thickness $L_T$ having an influence upon overwrite characteristics of the thin film magnetic head are optimized and thus excellent overwrite characteristics can be ensured. In this case, the occurrence of side erase during recording can be also prevented.

Further, when the thickness $L_T$ is within a range of $1.0$ ($\mu$m)$< L_T < 3.5$ ($\mu$m), and a nickel-iron alloy is used as a material of the one magnetic layer, the uniform-width portion of the first magnetic layer portion can be formed with high accuracy. In this case, the occurrence of side erase during recording can be prevented, and excellent overwrite characteristics can be also ensured.

Furthermore, when the distance $L_D$ is within a range of $0 \leq L_D < 4.0$ ($\mu$m), the thickness $L_T$ is within a range of $0.5$ ($\mu$m)$< L_T \leq 3.5$ ($\mu$m) and iron nitride is used as a material of the one magnetic layer, the above-mentioned distance $L_D$ and thickness $L_T$ having an influence upon overwrite characteristics of the thin film magnetic head are optimized and thus excellent overwrite characteristics can be ensured. In this case, the occurrence of side erase during recording can be also prevented.

Still furthermore, when the thickness L is within a range of $0.5$ ($\mu$m)$< L_T < 3.5$ ($\mu$m) and iron nitride is used as a material of the one magnetic layer, the uniform-width portion of the first magnetic layer portion can be formed with high accuracy. In this case, the occurrence of side erase during recording can be prevented, and excellent overwrite characteristics can be also ensured.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including: two magnetic layers magnetically coupled to each other and having two magnetic poles which face each other with a gap layer in between near and in a recording-medium-facing surface to be faced with a recording medium, a thin film coil provided between the two magnetic layers, and an insulating layer for insulating the thin film coil from one of the two magnetic layers having a first magnetic layer portion and a second magnetic layer portion, the first magnetic layer portion having a uniform-width portion extending away from a recording-medium-facing surface facing a recording medium and defining a write track width on the recording medium, and the second magnetic layer portion coating a region in which the thin film coil is provided and partly overlapping and magnetically coupled to a part of the first magnetic layer portion, wherein a distance $L_D$ ($\mu$m) between a position of an edge of the second magnetic layer portion closest to the recording-medium-facing surface and a position of the recording-medium-facing surface and a thickness $L_T$ ($\mu$m) of a portion of the first magnetic layer portion exposed to the recording-medium-facing surface satisfy $L_D \geq L_T$.

2. A thin film magnetic head according to claim 1, wherein the one magnetic layer is made of a material containing a nickel-iron alloy.

3. A thin film magnetic head according to claim 2, wherein the distance $L_D$ is within a range of $0 \leq L_D < 3.5$ ($\mu$m), and the thickness $L_T$ is within a range of $1.0$ ($\mu$m)$< L_T \leq 3.5$ ($\mu$m).

4. A thin film magnetic head according to claim 3, wherein the thickness $L_T$ is within a range of $1.0$ ($\mu$m)$< L_T < 3.5$ ($\mu$m).

5. A thin film magnetic head according to claim 2, wherein the thickness $L_T$ is within a range of $1.0$ ($\mu$m)$< L_T < 3.5$ ($\mu$m).

6. A thin film magnetic head according to claim 1, wherein the one of the two magnetic layers is made of a material containing iron nitride.

7. A thin film magnetic head according to claim 6, wherein the distance $L_D$ is within a range of $0 \leq L_D < 4.0$ ($\mu$m), and the thickness $L_T$ is within a range of $0.5$ ($\mu$m)$< L_T \leq 3.5$ ($\mu$m).

8. A thin film magnetic head according to claim 7, wherein the thickness $L_T$ is within a range of $0.5$ ($\mu$m)$< L_T < 3.5$ ($\mu$m).

9. A thin film magnetic head according to claim 6, wherein the thickness $L_T$ is within a range of $0.5$ ($\mu$m)$< L_T < 3.5$ ($\mu$m).

10. A thin film magnetic head according to claim 1, wherein
a minimum value $L_{Tmin}$ of the thickness $L_T$ satisfies $L_{Tmin} = 0.5 Bs + 1.5$, and
a maximum value $L_{Dmax}$ of the distance $L_D$ satisfies $L_{Dmax} = 0.5 Bs + 3.0$,
where Bs is a saturation flux density of a material of the one magnetic layer.

11. A thin film magnetic head according to claim 10, wherein the one magnetic layer is formed by using a material containing a nickel-iron alloy.

12. A thin film magnetic head according to claim 11, wherein the distance $L_D$ is within a range of $0 \leq L_D < 3.5$ ($\mu$m) and the thickness $L_T$ is within a range of $1.0$ ($\mu$m)$< L_T \leq 3.5$ ($\mu$m).

13. A thin film magnetic head according to claim 12, wherein the thickness $L_T$ is within a range of $1.0$ ($\mu$m)$< L_T < 3.5$ ($\mu$m).

14. A thin film magnetic head according to claim 11, wherein the thickness $L_T$ is within a range of $1.0$ ($\mu$m)$< L_T < 3.5$ ($\mu$m).

15. A thin film magnetic head according to claim 10, wherein the one magnetic layer is formed by using a material containing iron nitride.

16. A thin film magnetic head according to claim 15, wherein the distance $L_D$ is within a range of $0 \leq L_D < 4.0$ ($\mu$m) and the thickness $L_T$ is within a range of $0.5$ ($\mu$m)$< L_T \leq 3.5$ ($\mu$m).

17. A thin film magnetic head according to claim 16, wherein the thickness $L_T$ is within a range of $0.5$ ($\mu$m)$< L_T < 3.5$ ($\mu$m).

18. A thin film magnetic head according to claim 15, wherein the thickness $L_T$ is within a range of $0.5$ ($\mu$m)$< L_T < 3.5$ ($\mu$m).

19. A method of manufacturing a thin film magnetic head including: two magnetic layers magnetically coupled to each other and having two magnetic poles which face each other with a gap layer in between near and in a recording-medium-facing surface to be faced with a recording medium, a thin film coil provided between the two magnetic layers, and an insulating layer for insulating the thin film coil from one of the two magnetic layers having a first magnetic layer portion and a second magnetic layer portion, the first magnetic layer portion having a uniform-width portion extending away from a recording-medium-facing surface facing a recording medium and defining a write track width on the recording medium, and the second magnetic layer portion coating a region in which the thin film coil is provided and partly overlapping and magnetically coupled to a part of the first magnetic layer portion, wherein the first magnetic layer portion and the second magnetic layer portion are formed so that a distance $L_D$ ($\mu$m) between a position of an edge of the second magnetic layer portion closest to the recording-medium-facing surface and a position of the recording-medium-facing surface and a thickness $L_T$ ($\mu$m) of a portion of the first magnetic layer portion exposed to the recording-medium-facing surface satisfy $L_D \geq L_T$.

20. A method of manufacturing a thin film magnetic head according to claim 19, wherein the one magnetic layer is made of a material containing a nickel-iron alloy.

21. A method of manufacturing a thin film magnetic head according to claim 20, wherein the one magnetic layer is formed so that the distance $L_D$ is within a range of $0 \leq L_D < 3.5$ ($\mu$m), and the thickness $L_T$ is within a range of $1.0$ ($\mu$m)$< L_T \leq 3.5$ ($\mu$m).

22. A method of manufacturing a thin film magnetic head according to claim 21, wherein the one magnetic layer is formed so that the thickness $L_T$ is within a range of $1.0$ ($\mu$m)$< L_T \leq 3.5$ ($\mu$m).

23. A method of manufacturing a thin film magnetic head according to claim 20, wherein the one magnetic layer is formed so that the thickness $L_T$ is within a range of $1.0$ ($\mu$m)$< L_T \leq 3.5$ ($\mu$m).

24. A method of manufacturing a thin film magnetic head according to claim 19, wherein the one of the two magnetic layers if made of a material containing iron nitride.

25. A method of manufacturing a thin film magnetic head according to claim 24, wherein the one magnetic layer is formed so that the distance $L_D$ is within a range of $0 \leq L_D < 4.0$ ($\mu$m), and the thickness $L_T$ is within a range of $0.5$ ($\mu$m)$< L_T \leq 3.5$ ($\mu$m).

26. A method of manufacturing a thin film magnetic head according to claim 25, wherein the one magnetic layer is formed so that the thickness $L_T$ is within a range of $0.5$ ($\mu$m)$< L_T < 3.5$ ($\mu$m).

27. A method of manufacturing a thin film magnetic head according to claim 24, wherein the one magnetic layer is formed so that the thickness $L_T$ is within a range of $0.5$ ($\mu$m)$< L_T < 3.5$ ($\mu$m).

28. A method of manufacturing a thin film magnetic head according to claim 19, wherein the one magnetic layer is formed so that a minimum value $L_{Tmin}$ of the thickness $L_T$ satisfies $L_{Tmin} = 0.5 Bs + 1.5$, and
a maximum value $L_{Dmax}$ of the distance $L_D$ satisfies $L_{Dmax} = 0.5 Bs + 3.0$,
where Bs is a saturation flux density of a material of a material of the one magnetic layer.

29. A method of manufacturing a thin film magnetic head according to claim 28, wherein the one magnetic layer is formed by using a material containing a nickel-iron alloy.

30. A method of manufacturing a thin film magnetic head according to claim 29, wherein the distance $L_D$ is within a range of $0 \leq L_D < 3.5$ ($\mu$m) and the thickness $L_T$ is within a range of $1.0$ ($\mu$m)$< L_T \leq 3.5$ ($\mu$m).

31. A method of manufacturing a thin film magnetic head according to claim 30, wherein the thickness $L_T$ is within a range of $1.0$ ($\mu$m)$< L_T < 3.5$ ($\mu$m).

32. A method of manufacturing a thin film magnetic head according to claim 29, wherein the thickness $L_T$ is within a range of $1.0$ ($\mu$m)$< L_T < 3.5$ ($\mu$m).

33. A method of manufacturing a thin film magnetic head according to claim 28, wherein the one magnetic layer is formed by using a material containing iron nitride.

34. A method of manufacturing a thin film magnetic head according to claim 33, wherein the distance $L_D$ is within a range of $0 \leq L_D < 4.0$ ($\mu$m) and the thickness $L_T$ is within a range of $0.5$ ($\mu$m)$< L_T \leq 3.5$ ($\mu$m).

35. A method of manufacturing a thin film magnetic head according to claim 34, wherein the thickness $L_T$ is within a range of $0.5$ ($\mu$m)$< L_T < 3.5$ ($\mu$m).

36. A method of manufacturing a thin film magnetic head according to claim 33, wherein the thickness $L_T$ is within a range of $0.5$ ($\mu$m)$< L_T < 3.5$ ($\mu$m).

37. A thin film magnetic head including: two magnetic layers magnetically coupled to each other and having two magnetic poles which face each other with a gap layer in between near and in a recording-medium-facing surface to be faced with a recording medium, a thin film coil provided between the two magnetic layers and having at least one layer of thin film coil portion, and an insulating layer for insulating the thin film coil from one of the two magnetic layers having a first magnetic layer portion and a second magnetic layer portion, the first magnetic layer portion having a uniform-width portion extending away from a recording-medium-facing surface facing a recording medium and defining a write track width on the recording medium, the second magnetic layer portion coating a region in which the thin film coil is provided and partly overlapping and magnetically coupled to a part of the first magnetic layer portion, a lowest layer of the thin film coil portion being provided in an area corresponding to a thickness of the first magnetic layer portion, an area of the gap layer that excludes a portion corresponding to the uniform-width portion being selectively removed, and an area of the other magnetic layer that excludes a portion corresponding to the uniform-width portion being selectively recessed to a predetermined depth, wherein a distance $L_D$ ($\mu$m) between a position of an edge of the second magnetic layer portion closest to the recording-medium-facing surface and a position of the recording-medium-facing surface and a thickness $L_T$ ($\mu$m) of a portion of the first magnetic layer portion exposed to the recording-medium-facing surface satisfy $L_D \geq L_T - 2.0$ ($\mu$m).

38. A thin film magnetic head including: two magnetic layers magnetically coupled to each other and having two magnetic poles which face each other with a gap layer in between near and in a recording-medium-facing surface to be faced with a recording medium, a thin film coil provided between the two magnetic layers and having at least one layer of thin film coil portion and an insulating layer for insulating the thin film coil from one of the two magnetic layers having a first magnetic layer portion and a second magnetic layer portion, the first magnetic layer portion having a uniform-width portion extending away from a recording-medium-facing surface facing a recording medium and defining a write track width on the recording medium, the second magnetic layer portion coating a region in which the thin film coil is provided and partly overlapping and magnetically coupled to a part of the first magnetic layer portion, an area of the gap layer that excludes a portion corresponding to the uniform-width portion being selectively removed, an area of the other magnetic layer that excludes a portion corresponding to the uniform-width portion being selectively recessed to a predetermined depth, the insulating layer including an insulating layer portion in which a lowest layer of thin film coil portion is buried, the first magnetic layer portion being buried with the insulating layer portion and constituting a plane with the insulating layer portion, and the second magnetic layer portion being provided on the plane, wherein a distance $L_D$ ($\mu$m) between a position of an edge of the second magnetic layer portion closest to the recording-medium-facing surface and a position of the recording-medium-facing surface and a thickness $L_T$ ($\mu$m) of a portion of the first magnetic layer portion exposed to the recording-medium-facing surface satisfy $L_D \geq L_T - 2.0$ ($\mu$m).

39. A method of manufacturing a thin film magnetic head including: two magnetic layers magnetically coupled to each other and having two magnetic poles which face each other with a gap layer in between near and in a recording-medium-facing surface to be faced with a recording medium, a thin film coil provided between the two magnetic layers and having at least one layer of thin film coil portion, and an insulating layer for insulating the thin film coil from one of the two magnetic layers having a first magnetic layer portion and a second magnetic layer portion, the first magnetic layer portion having a uniform-width portion extending away from a recording-medium-facing surface facing a recording medium and defining a write track width on the recording medium, the second magnetic layer portion coating a region in which the thin film coil is provided and partly overlapping and magnetically coupled to a part of the first magnetic layer portion, a lowest layer of thin film coil portion being provided in an area corresponding to a thickness of the first magnetic layer portion, an area of the gap layer that excludes a portion corresponding to the uniform-width portion being selectively removed, and an area of the other magnetic layer that excludes a portion corresponding to the uniform-width portion being selectively recessed to a predetermined depth, wherein the first magnetic layer portion and the second magnetic layer portion are formed so that a distance $L_D$ ($\mu$m) between a position of an edge of the second magnetic layer portion closest to the recording-medium-facing surface and a position of the recording-medium-facing surface and a thickness $L_T$ ($\mu$m) of a portion of the first magnetic layer portion exposed to the recording-medium-facing surface satisfy $L_D \geq L_T - 2.0$ ($\mu$m).

40. A method of manufacturing a thin film magnetic head including: two magnetic layers magnetically coupled to each other and having two magnetic poles which face each other with a gap layer in between near and in a recording-medium-facing surface to be faced with a recording medium, a thin film coil provided between the two magnetic layers and having at least one layer of thin film coil portion, and an insulating layer for insulating the thin film coil from one of the two magnetic layers having a first magnetic layer portion and a second magnetic layer portion, the first magnetic layer portion having a uniform-width portion extending away from a recording-medium-facing surface facing a recording medium and defining a write track width on the recording medium, the second magnetic layer portion coating a region in which the thin film coil is provided and partly overlapping and magnetically coupled to a part of the first magnetic layer portion, an area of the gap layer that excludes a portion corresponding to the uniform-width portion being selectively removed, an area of the other magnetic layer that excludes a portion corresponding to the uniform-width portion being selectively recessed to a predetermined depth, the insulating layer including an insulating layer portion in which a lowest layer of thin film coil portion is buried, the first magnetic layer portion being buried with the insulating layer portion and constituting a plane with the insulating layer portion, and the second magnetic layer portion being provided on the plane, wherein the first magnetic layer portion and the second magnetic layer portion are formed so that a distance $L_D$ (μm) between a position of an edge of the second magnetic layer portion closest to the recording-medium-facing surface and a position of the recording-medium-facing surface and a thickness $L_T$ (μm) of a portion of the first magnetic layer portion exposed to the recording-medium-facing surface satisfy $L_D \geq L_T - 2.0$ (μm).

* * * * *